United States Patent
Tanimoto

(10) Patent No.: US 7,242,496 B2
(45) Date of Patent: Jul. 10, 2007

(54) FACSIMILE MACHINE AND DATA CONVERSION DEVICE

(75) Inventor: Yoshifumi Tanimoto, Hirakata (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 10/957,737

(22) Filed: Oct. 5, 2004

(65) Prior Publication Data

US 2005/0088686 A1    Apr. 28, 2005

(30) Foreign Application Priority Data

Oct. 10, 2003  (JP) ............................. 2003-353024
Oct. 10, 2003  (JP) ............................. 2003-353025

(51) Int. Cl.
  *G06F 3/12*   (2006.01)
  *G06F 15/00*  (2006.01)

(52) U.S. Cl. ................... 358/1.15; 358/1.13; 358/468; 358/407

(58) Field of Classification Search ............... 358/1.15, 358/402, 403, 407, 442, 468, 1.13, 1.18, 358/1.14, 1.1; 709/206, 218, 219
See application file for complete search history.

(56) References Cited

U.S. PATENT DOCUMENTS 5,848,413 A * 12/1998 Wolff ........................... 707/10
5,873,077 A *  2/1999 Kanoh et al. ................. 707/3
5,953,392 A *  9/1999 Rhie et al. ................ 379/88.13
6,307,641 B1* 10/2001 Hamano et al. ........... 358/1.15
6,333,787 B1* 12/2001 Konno ....................... 358/1.13
6,348,970 B1*  2/2002 Marx ......................... 358/1.15

FOREIGN PATENT DOCUMENTS

| JP | 6-217055      |   | 8/1994 |
|----|---------------|---|--------|
| JP | 08-123714 A   |   | 5/1996 |
| JP | 08123714 A    | * | 5/1996 |
| JP | 10-098577     |   | 4/1998 |
| JP | 2000-270150 A |   | 9/2000 |
| JP | 2000270150 A  | * | 9/2000 |
| JP | 2003-76600    |   | 3/2003 |
| JP | 2003-076600 A |   | 3/2003 |
| JP | 2003-169183   |   | 6/2003 |
| JP | 2003-179721   |   | 6/2003 |

\* cited by examiner

*Primary Examiner*—Dov Popovici
(74) *Attorney, Agent, or Firm*—Westerman, Hattori, Daniels & Adrian, LLP.

(57) ABSTRACT

A facsimile machine provides file specifying information of a transmission file to an agent software. The agent software runs an appropriate application program in accordance with the file specifying information. By using this function, a prescribed file on a data conversion device is converted directly into an image content via a network from the facsimile machine. Accordingly, a facsimile transmission of the image content to a prescribed destination can be carried out just by an operation from the facsimile machine. As a result, an efficiency of a facsimile transmission process is improved.

18 Claims, 17 Drawing Sheets

FIG. 4

| PC NAME /300 | FILE NAME /302 | APPLICATION PROGRAM NAME /304 |
|---|---|---|
| PC1 | a1 FILE | APPLICATION PROGRAM A /306 |
| | a2 FILE | APPLICATION PROGRAM C |
| | ⋮ | ⋮ |
| PC2 | b1 FILE | APPLICATION PROGRAM B |
| | b2 FILE | APPLICATION PROGRAM C |
| | ⋮ | ⋮ |

| PC NAME /400 | FILE ID /402 | FILE NAME /404 |
|---|---|---|
| PC1 | 1 | a1 FILE |
|  | 2 | a2 FILE |
|  | ⋮ | ⋮ |
| PC2 | 1 | b1 FILE |
|  | 2 | b2 FILE |
|  | ⋮ | ⋮ |

406 (PC1 row)

| FILE ID | FILE NAME | PATH NAME |
|---|---|---|
| 1 | a1 FILE | ¥¥FILE SERVER¥A FOLDER |
| 2 | a2 FILE | ¥¥FILE SERVER¥A FOLDER |
| ...... | ...... | ...... |
| 100 | b1 FILE | ¥¥FILE SERVER¥B FOLDER |
| 101 | b2 FILE | ¥¥FILE SERVER¥B FOLDER |
| ...... | ...... | ...... |

FACSIMILE MACHINE AND DATA CONVERSION DEVICE

BACKGROUND OF THE INVENTION

1. Field of the Invention

The present invention relates to data transmission technology, and more particularly to a facsimile machine and a data conversion device which convert data of a prescribed format into data of a format appropriate for data transmission and transmit the converted data.

2. Description of the Related Art

Accompanying a recent development in network technology, information equipment such as a facsimile machine and a Multi Function Peripheral (MFP) is connected to a network. When carrying out a facsimile transmission of an original document generated by a certain application program from such a facsimile machine, for example, the original document is required to be printed out and the printed out sheet is required to be scanned by a scanner device.

In general, in a system which transmits a content not limited to image data, there are cases in which a data format of the content is converted at a client terminal or at a server according to necessity. According to one technology, the server receives a request of a distribution of the content from the client terminal, into an appropriate data format for each client terminal.

In a company or the like, terminal devices such as a Personal Computer (PC) and devices such as a file server and a printer are connected to a network such as a Local Area Network (LAN). The terminal devices and the devices use files of one another via the network. Accordingly, a worker can work efficiently in a paperless environment. With respect to a facsimile machine which can be connected to the network, by installing a facsimile driver software to the PC, a facsimile transmission can be instructed from the PC to the facsimile machine. However, the facsimile driver software is required to be installed to each PC. In addition, according to an ability of the PC, there are cases in which a processing speed of another application program is reduced. Although a facsimile transmission of a shared file can be instructed from the PC, the facsimile transmission of the shared file cannot be carried out from the facsimile machine. Due to such operations, compared with other communication devices on the network, the transmission process cannot be carried out efficiently in the facsimile machine which causes the worker to feel inconvenienced.

SUMMARY OF THE INVENTION

The present invention has been made in consideration to such a circumstance. An advantage of the present invention is to provide a technology which can efficiently carry out a facsimile operation in a facsimile machine on a network and which can carry out a facsimile transmission of a shared file on the network by an operation from the facsimile machine.

An aspect of the present invention is a facsimile machine which transmits to a prescribed device, a content of a data format according to a communication ability of the prescribed device. The facsimile machine includes a file specifying information transmission unit, an acquiring unit, a conversion unit and a communication data transmission unit. The file specifying information transmission unit transmits to a data conversion device which generates an image content in accordance with a file of a prescribed data format, file specifying information for specifying a file to be processed in the data conversion device. The acquiring unit acquires from the data conversion device, the image content generated in accordance with the file specified by the file specifying information. The conversion unit converts the image content into communication data for a transmission. The communication data transmission unit transmits the communication data to a prescribed destination. Accordingly, a series of operations from the selection of a prescribed file from the facsimile machine via the network to the transmission of the prescribed file to a prescribed destination can be carried out just by an operation from the facsimile machine.

The "image content" is a file handled by a facsimile machine to be operated. The "image content" refers to digital data for forming an image such as a photograph, a picture and an illustration.

Another aspect of the present invention is a data conversion device which converts a prescribed file into a prescribed data format. The data conversion device includes a receiving unit, a generating unit and a transmission unit. The receiving unit receives file specifying information for specifying the prescribed file from a prescribed facsimile machine. The generating unit specifies a file in accordance with the file specifying information. Then, by using an application program corresponding to the specified file, the generating unit generates an image content in accordance with the file. The transmission unit transmits the image content to the facsimile machine. Accordingly, even when a prescribed application program is not installed in the facsimile machine, the image content can be generated by the data conversion device and the facsimile machine can acquire the generated image content.

The data conversion device further includes a holding unit which holds a relationship between a data format of a file and an application program for converting the file into an image content. The generating unit can select an application program corresponding to the file in accordance with the relationship held in the holding unit. Accordingly, in accordance with the file specifying information designated from the facsimile machine, an appropriate application program can be run.

Another aspect of the present invention is a facsimile machine which transmits to a prescribed device, a content of a data format according to a communication ability of the prescribed device. The facsimile machine includes an accepting unit, a selecting unit, a file specifying information transmission unit, an acquiring unit, a conversion unit and a communication data transmission unit. The accepting unit accepts a destination of a file to be transmitted. The selecting unit selects from a plurality of data conversion devices, a data conversion device which can generate an image content in accordance with the file to be transmitted. Further, each of the plurality of data conversion devices generates an image content in accordance with a file of at least one data format, respectively. The file specifying information transmission unit transmits to the selected data conversion device, file specifying information for specifying the file to be transmitted. The acquiring unit acquires from the data conversion device to which the file specifying information is transmitted, an image content generated in accordance with the file to be transmitted specified by the file specifying information. The conversion unit converts the acquired image content into communication data for a facsimile transmission. The communication data transmission unit transmits the communication data to a prescribed destination. Accordingly, a series of operations from the selection of a prescribed file from the facsimile machine via the network to the transmission of the prescribed file to a prescribed destination can be carried out just by an operation from the facsimile machine. In addition, since a data conversion device can be selected from a plurality of data conversion devices, when a failure is generated in a certain data conversion device and a normal processing cannot be carried out, the processing can be proceeded to another device. As a result, a tolerance against a failure in the facsimile communication system can be improved.

The facsimile machine further includes a holding unit which holds a data format of a file which can be converted into an image content by each of the data conversion devices. The facsimile machine can select a data conversion device in accordance with a data format of a file to be transmitted. Accordingly, according to the data format of the file, the facsimile machine can appropriately select the data conversion device which can convert a file in that data format into an image content.

The facsimile machine further includes a management unit which manages a load in each of the data conversion devices. The facsimile machine can select the data conversion device in accordance with the load. Accordingly, the facsimile machine can unify the management of the load in each of the plurality of data conversion devices and disperse the processes so that the load in each of the data conversion devices becomes even. In addition, by selecting the data conversion device with a small load, the facsimile machine can instruct the conversion process to the data conversion device which can carry out the data conversion process within a short period of time. Furthermore, the facsimile machine can prevent other processes in the data conversion device from being influenced by the data conversion process.

Further, any combinations of the above-described constituent elements and the conversions of the expression of the present invention between a method, a device, a system, a recording medium, a computer program or the like are also effective as an embodiment of the present invention.

According to the present invention, the series of operation from the selection of a prescribed file from the facsimile machine via the network such as the LAN to the transmission of the prescribed file to a prescribed destination can be carried out just by an operation from the facsimile machine. Therefore, from an aspect of operationality and efficiency, the present invention can provide a better facsimile machine and a data conversion device relating to such a facsimile machine.

BRIEF DESCRIPTION OF THE DRAWINGS

FIG. 4 shows an example of a data structure stored in an application program information storage unit.

FIG. 5 shows an example of a data structure stored in a file list storage unit.

FIG. 12 shows an example of a data structure stored in a file list storage unit.

DETAILED DESCRIPTION OF THE PREFERRED EMBODIMENTS

First Embodiment

Figure 1:
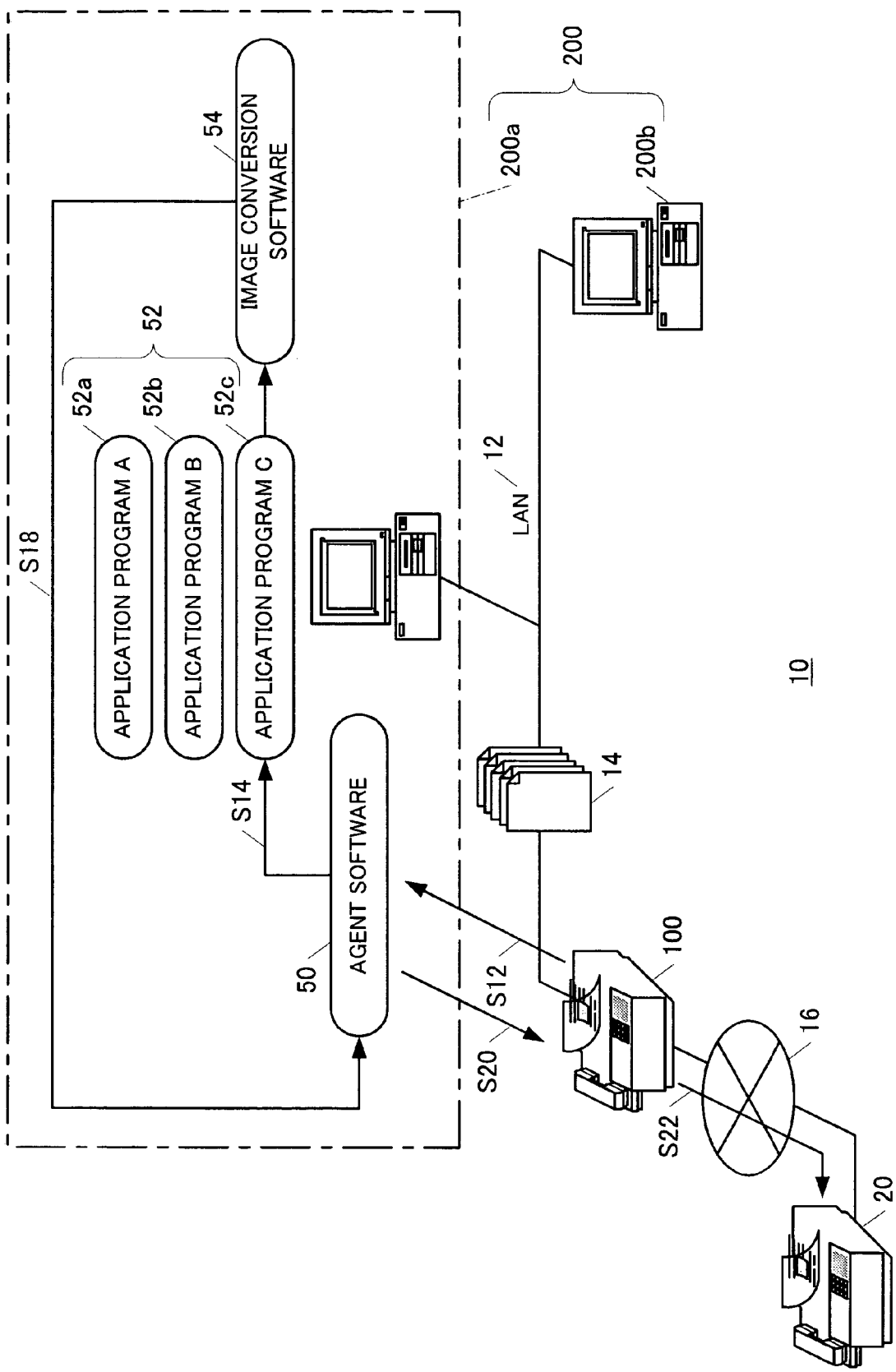
FIG. 1 shows a facsimile communication system including a first facsimile machine and a data conversion device according to a first embodiment of the present invention.
Figure 2:
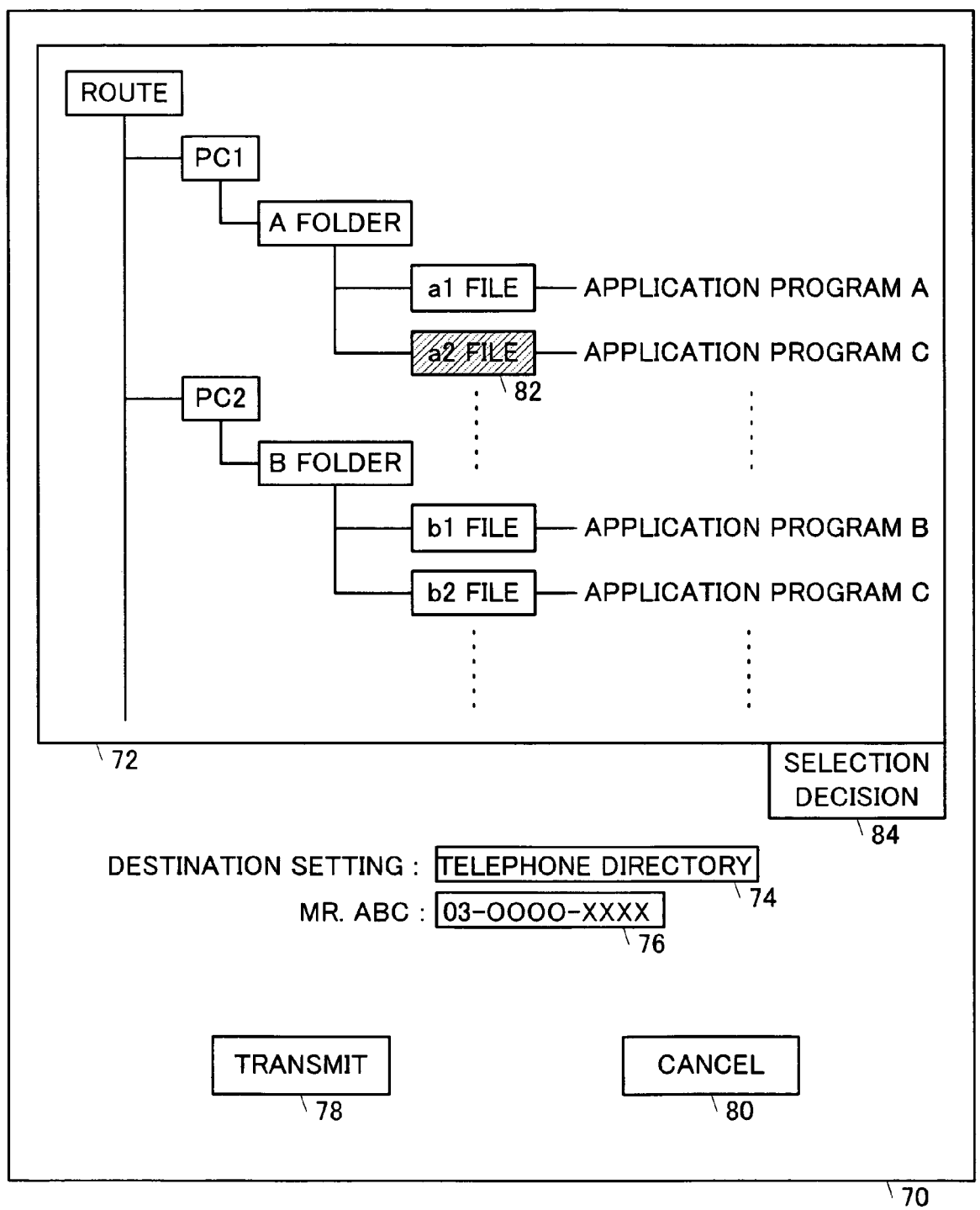
FIG. 2 shows an example of an operation screen of the first facsimile machine.

FIG. 1 shows a facsimile communication system 10 including a first facsimile machine 100 and a data conversion device 200 according to a first embodiment of the present invention. FIG. 2 shows an example of an operation screen of the first facsimile machine 100.

The first facsimile machine 100 can be a machine having a facsimile communication (transmission and reception) function such as a facsimile machine and a MFP. To distinguish between a transmitter and a recipient, the transmitter will be referred to as the first facsimile machine 100 and the recipient will be referred to as a second facsimile machine 20. Although details will be described later, an agent software 50 in a data conversion device 200 is managed by an agent management unit in the first facsimile machine 100. Therefore, the data conversion device 200 functions as a client terminal with respect to the agent management unit of the first facsimile machine 100 which functions as a server.

In the facsimile communication system 10 of the first embodiment, the first facsimile machine 100 and the data conversion device 200 of various specifications are connected via a network 12. The first facsimile machine 100 and the second facsimile machine 20 are connected via a Public Switched Telephone Network (PSTN) 16. For example, the network 12 can be a LAN, a Wide Area Network (WAN) or a communication network which transmits and receives prescribed data in accordance with a communication standard such as a Transmission Control Protocol/Internet Protocol (TCP/IP). The PSTN 16 can be the Internet or a private line. As a facsimile communication protocol, T.30, T.37 and T.38 or the like can be used.

A facsimile operation screen 70 of the first facsimile machine 100 shown in FIG. 2 includes a Graphical User Interface (GUI) of a touch panel format for accepting an operation from a user. The facsimile operation screen 70 includes a file list display area 72, a telephone directory display button 74, a destination input area 76, a transmit button 78, a cancel button 80 and a selection decision button 84 or the like.

When a file to be transmitted by facsimile (hereinafter referred to as the "transmission file") is designated on the file list display area 72, for example, the first facsimile machine 100 changes a display of a designated file 82 into a hatching display. Then, when the selection decision button 84 is pressed, the file displayed with hatchings is selected as the transmission file.

When setting a destination, the user inputs a facsimile number or an electronic mail address or the like to the destination input area 76. When the telephone directory display button 74 is pressed, the telephone directory is displayed. Therefore, the user can select a destination from the displayed telephone directory.

When a destination is input to the destination input area 76, the transmit button 78 becomes capable of being pressed. Then, when the transmit button 78 is pressed, the first facsimile machine 100 carries out a facsimile transmission of the transmission file to the destination input in the destination input area 76. When the cancel button 80 is pressed, the facsimile transmission process is interrupted.

Referring to FIG. 1 again, the data conversion device 200 is a terminal device such as a PC. The data conversion device 200 includes the agent software 50, an application program 52 and image conversion software 54.

Although details will be described later, the agent software 50 is resident on a client terminal like the driver software when using the facsimile machine. The agent software 50 is a program which exchanges data or command, etc. with the first facsimile machine 100 via the network 12.

The image conversion software 54 is a program which converts a file other than an image content into a data format of the image content.

Next, a flow of data will be described. When the transmit button 78 of the facsimile operation screen 70 shown in FIG. 2 is pressed, the first facsimile machine 100 transmits file specifying information 14 to the agent software 50 (S12). The file specifying information 14 can be a file body or information clarifying a location of the file such as a path, a Uniform Resource Identifier (URI) and a Uniform Resource Locators (URL). The agent software 50 runs the application program 52 corresponding to the file specifying information 14 (S14) and converts the file into an image content by the image conversion software 54. Then, the agent software 50 acquires the image content from the image conversion software 54 (S18) and transmits the image content to the first facsimile machine 100 (S20). Subsequently, the first facsimile machine 100 converts the image content into communication data for a facsimile transmission and transmits the communication data to the second facsimile machine 20 (S22).

Accordingly, a series of operations from the selection of a prescribed file from the first facsimile machine 100 to the transmission of the file to the second facsimile machine 20 can be carried out just by the operation from the facsimile machine via the network. As a result, a period of time required for the facsimile transmission can be shortened, a time required for a printing process can be reduced and the cost of printing papers can be reduced.

Figure 3:
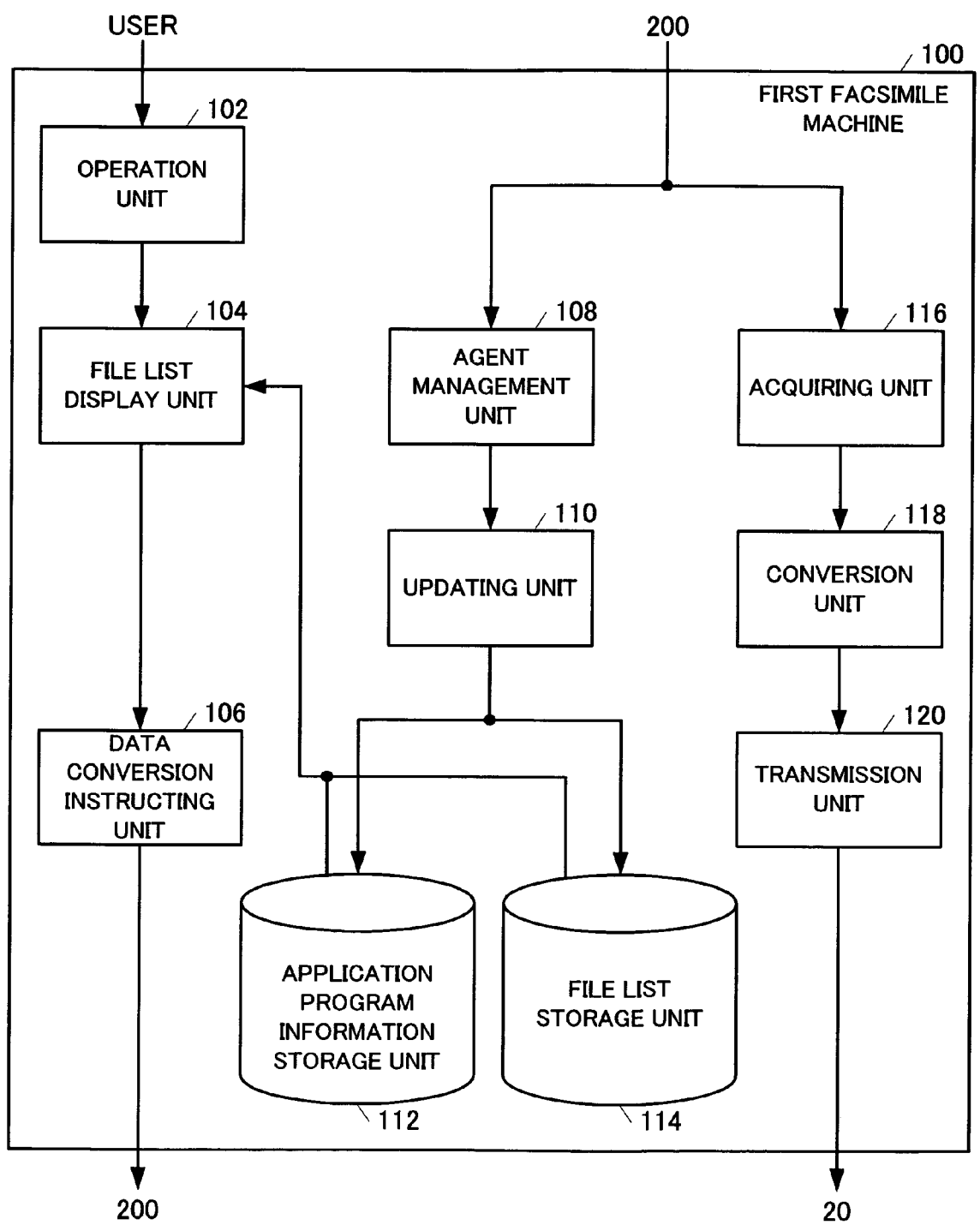
FIG. 3 is a block diagram showing an inner configuration of the first facsimile machine.

FIG. 3 is a block diagram showing an inner configuration of the first facsimile machine 100. In terms of hardware components, each of the constituent elements of the first facsimile machine 100 is realized primarily by a Central Processing Unit (CPU) of any computer, a memory, a program which implements a function for managing the agent software of the data conversion device 200 loaded in the memory, a storage unit such as a hard disk for storing the program, an interface for a network connection and a modem for a facsimile communication or the like. However, it is to be understood by those skilled in the art that there are variations to the methods and the devices for implementing each of the constituent elements of the first facsimile machine 100. Each of the drawings to be described hereinafter shows blocks representing units of function, instead of units of hardware.

The file list display unit 104 loads data stored in an application program information storage unit 112 and a file list storage unit 114. Then, the file list display unit 104 displays a file list of files which can be transmitted by facsimile on the file list display area 72 of FIG. 2. The file list display unit 104 also displays application program names corresponding to the files. The application program information storage unit 112 stores a relationship between the file name and the application program to be run. The file list storage unit 114 stores a relationship between the file name and file specifying information. As another embodiment, the application program information storage unit 112 and the file list storage unit 114 can be combined. That is, the file name, the application program to be run and the file specifying information can exist in a single information storage unit.

An operation unit 102 is an input device such as a keyboard, a button, a touch panel and a mouse. The operation unit 102 accepts various requests and instructions for the facsimile operation screen 70 of FIG. 2 from the user. The operation unit 102 provides the transmission file accepted from the user to the file list display unit 104.

With a file name or the like of the transmission file provided from the operation unit 102 as the key, the file list display unit 104 acquires prescribed file specifying information from the file list storage unit 114 and outputs the acquired file specifying information to a data conversion instructing unit 106. In the same manner, with the file name or the like as the key, the file list display unit 104 can acquire prescribed application program information from the application program information storage unit 112 and output the acquired application program information to the data conversion instructing unit 106.

The data conversion instructing unit 106 acquires the file specifying information provided from the file list display unit 104. Then, the data conversion instructing unit 106 transmits the acquired file specifying information to the data conversion device 200 of FIG. 1 and requests a conversion of the data format of the image content.

Figure 6:
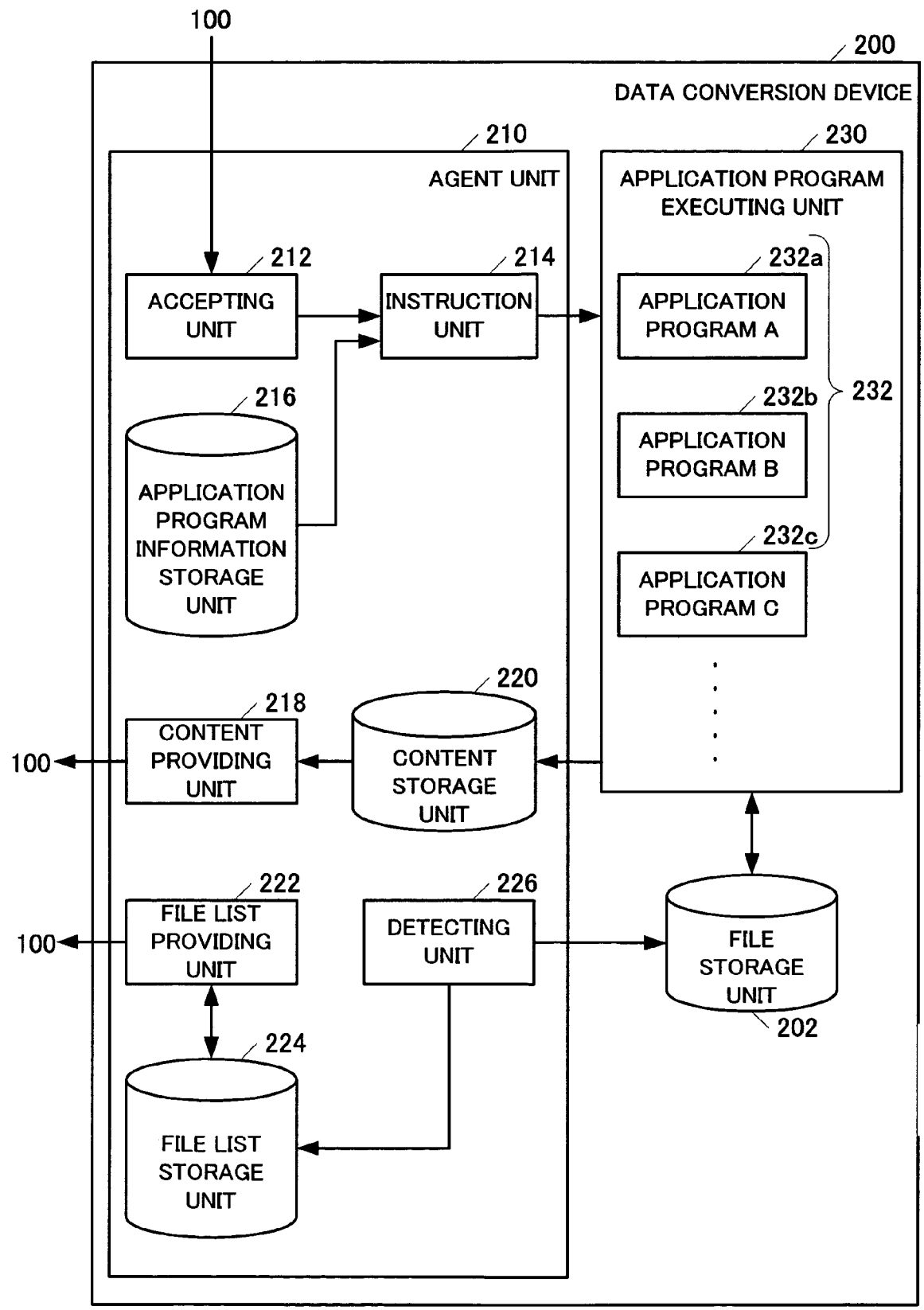
FIG. 6 is a block diagram showing an inner configuration of the data conversion device.

An agent management unit 108 of the first facsimile machine 100 exchanges data or command with an agent unit 210 of FIG. 6 of the data conversion device 200 via the network. By using the data acquired from the data conversion device 200, the agent management unit 108 synchronizes the data with data in the first facsimile machine 100.

Specifically, the agent management unit 108 acquires from the data conversion device 200, data of an application program information storage unit 216 of FIG. 6 or data of a file list storage unit 224 of FIG. 6. Then, the agent management unit 108 provides the acquired data to an updating unit 110. In accordance with the acquired data, the agent management unit 108 instructs the updating unit 110 to update the data of the application program information storage unit 112 or the file list storage unit 114. The updating of the data is instructed when the agent management unit 108 instructs the data conversion device 200 to update the data or when the agent management unit 108 receives an instruction from the data conversion device 200 to update the data.

In accordance with the instruction from the agent management unit 108, the updating unit 110 updates the data stored in the application program information storage unit 112 or the file list storage unit 114 according to necessity. That is, when the data of the application program information storage unit 112 is different from the data of the application program information storage unit 216 of FIG. 6, the updating unit 110 reflects the latter on the former. When the data of the file list storage unit 114 is different from the data of the file list storage unit 224 of FIG. 6, the updating unit 110 reflects the latter on the former. Accordingly, the file specifying information and the application program information of the first facsimile machine 100 can be synchronized with those of the data conversion device 200. Therefore, for example, even when the file specifying information is changed by a file being added to or deleted from the data conversion device 200, the first facsimile machine 100 can acquire the changed file specifying information from the data conversion device 200. Then, in accordance with the acquired file specifying information, the first facsimile machine 100 can request a facsimile transmission to the data conversion device 200.

FIG. 4 shows an example of a data structure stored in the application program information storage unit 112. A PC name section 300 stores information for specifying a PC on the network such as a PC name, an ID, an Internet Protocol (IP) address and a Media Access Control (MAC) address of the data conversion device 200. A file name section 302 stores a file name. As another example, the file name section 302 can store file specifying information. An application program name section 304 stores an application program name for running the file. In FIG. 4, with respect to data 306, it can be understood that a file with a file name "a1 file" stored in a PC name "PC1" is to be run by an application program "application program A". The data structure of the application program information storage unit 216 of the data conversion device 200 can be the same as the data structure of the application program information storage unit 112. A PC name of the data conversion device 200 is stored in the PC name section 300.

Figure 5:
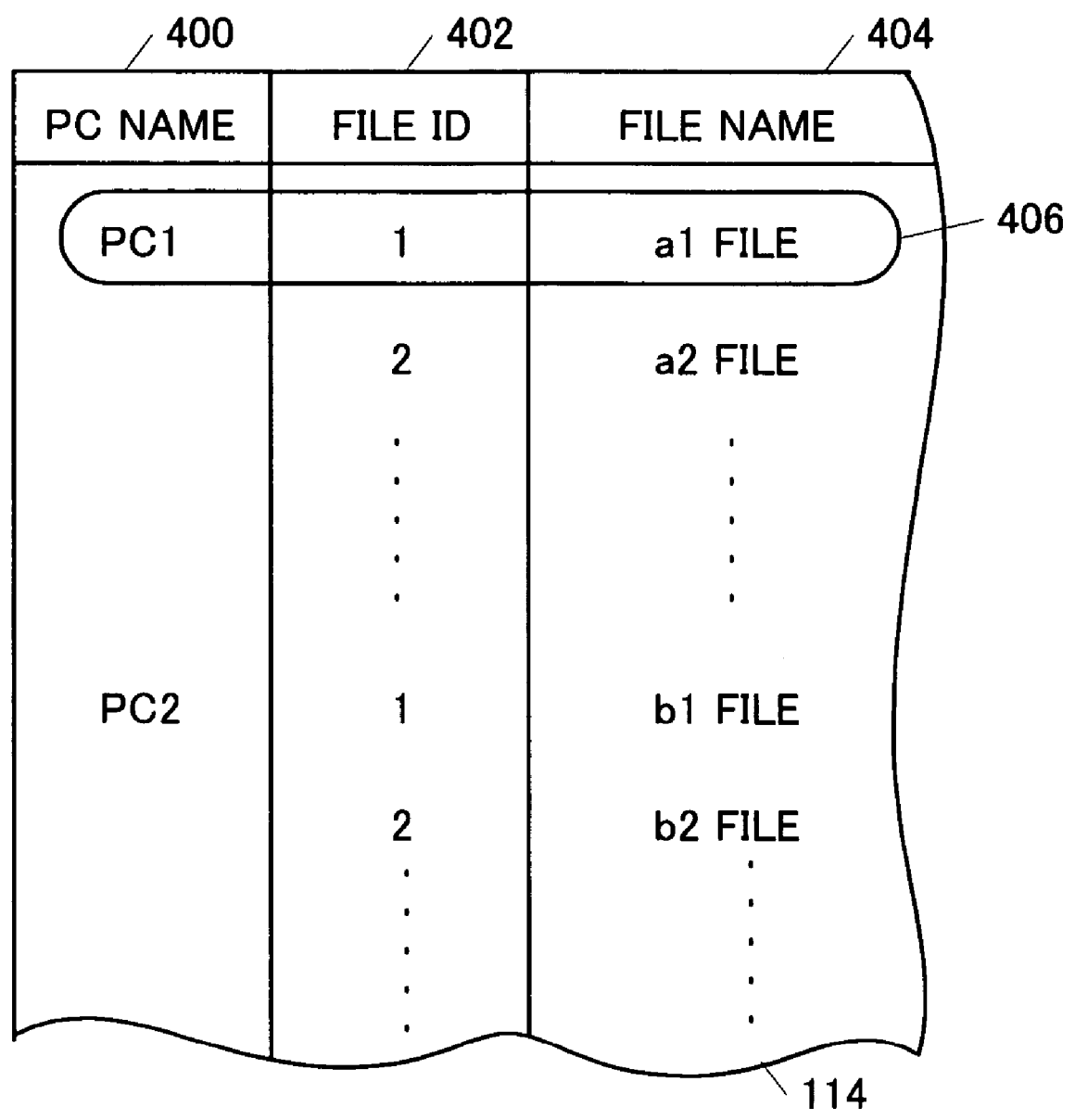

FIG. 5 shows an example of a data structure stored in the file list storage unit 114 of FIG. 3. In the same manner as FIG. 4, a PC name section 400 stores information for specifying the data conversion device 200 on the network. A file ID section 402 stores a file ID of a file. A file name section 404 stores a file name. As another example, the file name section 404 can store the file name or the file specifying information. In FIG. 5, with respect to data 406, a file ID of a file with a file name "a1 file" stored in a PC name "PC1" is "1". The data structure of the file list storage unit 224 of the data conversion device 200 can be the same as the data structure of the file list storage unit 114. A PC name of the data conversion device 200 is stored in the PC name section 400.

Referring to FIG. 3 again, the data conversion instructing unit 106 of the first facsimile machine 100 transmits an image content generating request to the data conversion device 200. After receiving the request, the data conversion device 200 generates an image content and provides the image content to the first facsimile machine 100. An acquiring unit 116 acquires the image content provided by the data conversion device 200 and provides the acquired image content to a conversion unit 118.

For example, the conversion unit 118 converts the image content provided from the acquiring unit 116 into a data format for a facsimile transmission such as G3 and G4. A transmission unit 120 acquires the content converted into facsimile transmission data generated by the conversion unit 118. Then, the transmission unit 120 transmits the content to the second facsimile machine 20. Accordingly, even when a prescribed program is not installed in the first facsimile machine 100, an image content can be generated by the data conversion device 200, and the first facsimile machine 100 can acquire the image content.

FIG. 6 is a block diagram showing an inner configuration of the data conversion device 200. An acquiring unit 212 acquires from the data conversion instructing unit 106 of the first facsimile machine 100 of FIG. 3, file specifying information to be transmitted.

With a file name or the like provided from the accepting unit 212 as the key, an instruction unit 214 selects an application program to be run from the data stored in the application program information storage unit 216. The instruction unit 214 provides the file specifying information or the selected application program information to an application program executing unit 230. Then, the instruction unit 214 instructs the application program executing unit 230 to run an application program 232.

The application program executing unit 230 includes a function for loading a file stored in a file storage unit 202, running the application program 232 corresponding to the loaded file and converting the file into an image content. In accordance with the file specifying information or the application program information provided from the instruction unit 214, the application program executing unit 230 converts the designated file into an image content and store the image content in a content storage unit 220. The file storage unit 202 stores a file which can be transmitted by facsimile.

A content providing unit 218 acquires the image content stored in the content storage unit 220 and provides the acquired image content to the acquiring unit 116 of FIG. 3 of the first facsimile machine 100.

A detecting unit 226 monitors the file which can be transmitted by facsimile stored in the file storage unit 202 and the file list stored in the file list storage unit 224. When there is a difference between the file and the file list, the file list stored in the file list storage unit 224 is updated. For example, when a file which can be transmitted by facsimile is added to or deleted from the file storage unit 202, or when a file name is changed, the detecting unit 226 updates the file list stored in the file list storage unit 224. The file list can be updated when the agent management unit 108 of FIG. 3 requests a file list to be provided or when the detecting unit 226 updates the file list storage unit 224 for each prescribed time. After updating the file list, a file list providing unit 222 provides the file list stored in the file list storage unit 224 to the first facsimile machine 100.

Figure 7:
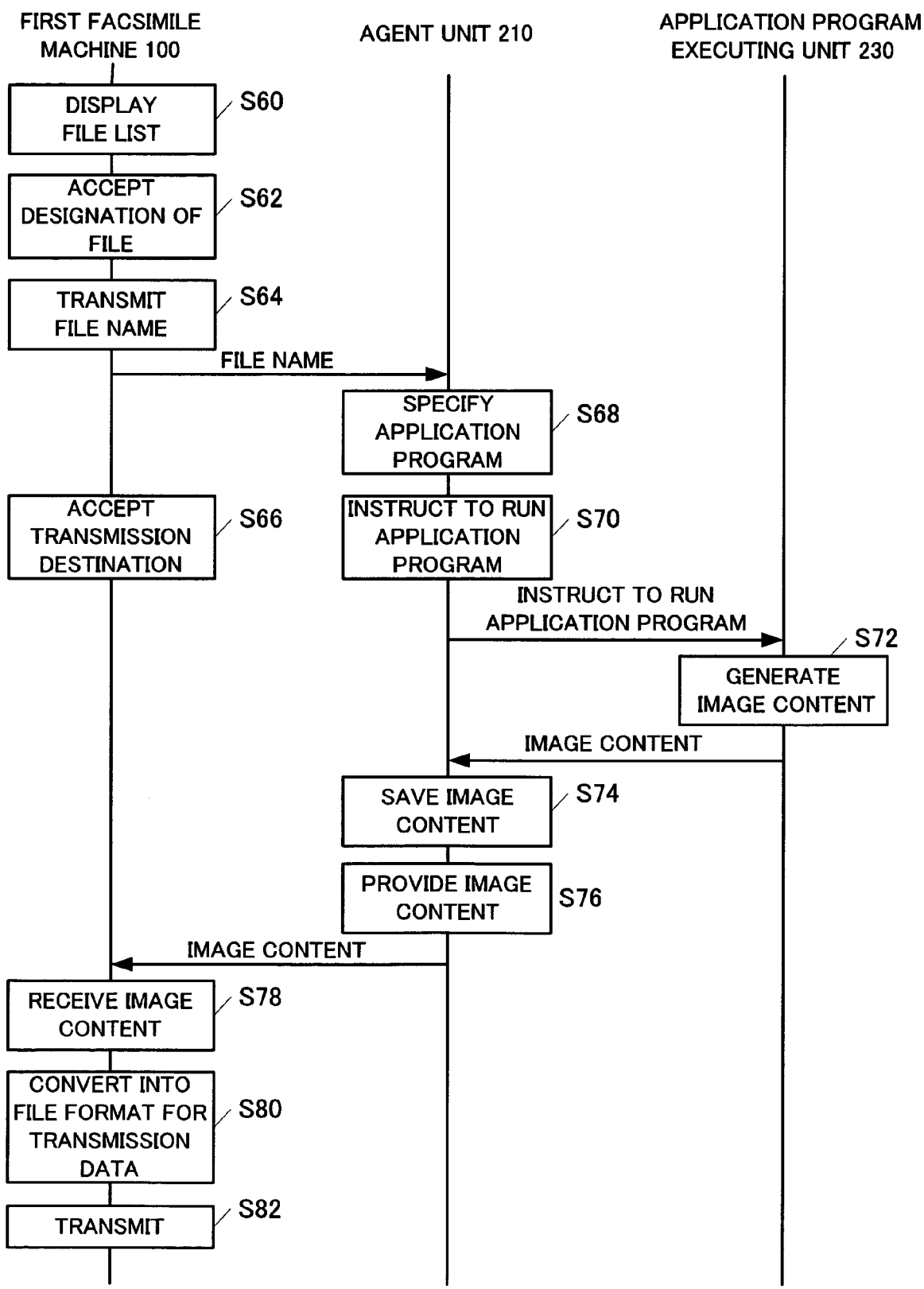
FIG. 7 is a sequence diagram relating to a conversion process into an image content carried out between the first facsimile machine and the data conversion device.

FIG. 7 is a sequence diagram relating to a conversion process into an image content carried out between the first facsimile machine 100 and the data conversion device 200.

The first facsimile machine 100 displays a list of files which can be transmitted by facsimile on the network (S60). The first facsimile machine 100 accepts the transmission file from the user (S62). The first facsimile machine 100 transmits the file specifying information such as the file name to the agent unit 210 of the data conversion device 200 (S64). At another time, the first facsimile machine 100 accepts a destination designated by the user (S66). The agent unit 210 specifies an application program to be run in accordance with the file specifying information (S68). The agent unit 210 instructs the application program executing unit 230 to run the application program (S70). The application program executing unit 230 runs the application program and generates the image content (S72). The agent unit 210 acquires the image content from the application program executing unit 230 and saves the acquired image content (S74). The agent unit 210 transmits the image content to the first facsimile machine 100 (S76). The first facsimile machine 100 receives the image content (S78) and converts the image content into a data format for a facsimile transmission (S80). Then, the first facsimile machine 100 transmits the converted image content by facsimile (S82).

The first embodiment of the present invention has been described. The above-described embodiment is an example. It is to be understood by those skilled in the art that there are variations to the combinations of each of the constituent elements and each of the processes and those variations also fall within the scope of the present invention. In the following, some of the variations of the first embodiment of the present invention will be described.

In the first embodiment of the present invention, the agent unit 210 of the data conversion device 200 of FIG. 6 is managed by the agent management unit 108 of the first facsimile machine 100 of FIG. 3. Therefore, the data conversion device 200 functions as a client of the first facsimile machine 100 (server) and is loaded in a terminal device such as the PC. As another embodiment of the present invention, a device having the function of the agent unit 210 can be provided separately from the data conversion device 200. The device having the function of the agent unit 210 can exchange data or command with the application program 52 and the image conversion software 54 of FIG. 1 on the terminal device such as the PC via the network 12 of FIG. 1.

As another embodiment of the present invention, when the user designates the transmission file to the file list display area 72 of FIG. 2 and the selection decision button 84 is pressed, the first facsimile machine 100 transmits the file specifying information 14 of FIG. 1 of the file to the agent software 50 of FIG. 1. Accordingly, without waiting for a destination of the facsimile transmission being designated by the user, the first facsimile machine 100 can prepare the image content of the transmission file. As a result, the facsimile transmission process can be carried out efficiently. In addition, the image data loaded by a general scanner function of the first facsimile machine 100 and the image content generated via the data conversion device 200 can be transmitted sequentially by one facsimile transmission process carried out by the user. Accordingly, the facsimile transmission process can be carried out efficiently.

Second Embodiment

Figure 8:
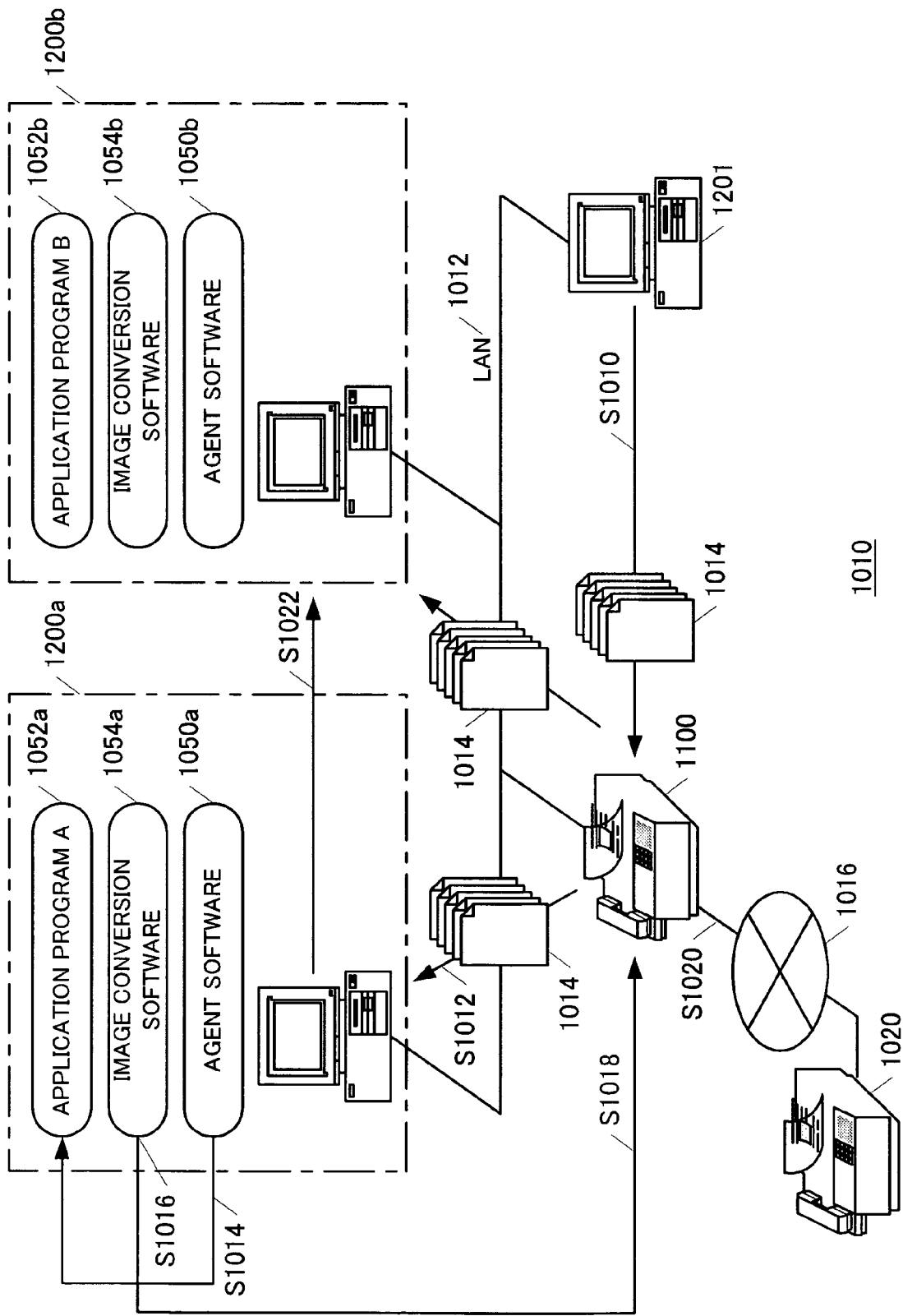
FIG. 8 shows a structure of a facsimile communication system including a third facsimile machine according to a second embodiment of the present invention.

FIG. 8 shows a structure of a facsimile communication system 1010 including a third facsimile machine 1100 according to a second embodiment of the present invention. Although details will be described later, the third facsimile machine 1100 is a machine which acquires an image content via a network and transmits the image content by facsimile. The third facsimile machine 1100 is connected to a fourth facsimile machine 1020 via a PSTN 1016. As another example, the PSTN 1016 can be a network such as the Internet or a private line. As a facsimile communication protocol, T.30, T.37, T.38, etc. can be used.

A first data conversion device 1200a and a second data conversion device 1200b (hereinafter referred to as a "data conversion device 1200") are connected to the third facsimile machine 1100 via a network 1012. For example, the network 1012 can be the LAN, the WAN or a communication network which transmits and receives prescribed data in accordance a communication standard such as the TCP/IP.

A file server 1201 is a computer for exchanging files on the network. In the second embodiment, the file server 1201 stores a file body which can be transmitted by facsimile. The file server 1201 is connected to the third facsimile machine 1100 via the network 1012.

The data conversion device 1200 is a terminal device such as the PC. The data conversion device 1200 includes an agent software 1050, an application program 1052 and an image conversion software 1054. Due to reasons such as having different Operating Systems (OS), the data conversion device 1200a and the data conversion device 1200b respectively have the agent software 1050, the application program 1052 and the image conversion software 1054 that are different from one another. In the following, an agent software 1050a and an agent software 1050b, which are different from one another, will be sometimes referred to as the agent software 1050. An application program 1052a and an application program 1052b, which are different from one another, will be sometimes referred to as the application program 1052. An image conversion software 1054a and an image conversion software 1054b, which are different from one another, will be sometimes referred to as the image conversion software 1054.

Although details will be described later, the agent software 1050 is resident on a client terminal like the driver software when using a facsimile machine. The agent software 1050 is a program which exchanges data or command, etc. with the third facsimile machine 1100 (server) via the network 1012.

The image conversion software 1054 is a program which converts a file other than an image content into a data format of the image content.

A flow of data in FIG. 8 will be described. When the third facsimile machine 1100 accepts a designation of a transmission file from the user, the third facsimile machine 1100 requests file specifying information 1014 for specifying the designated transmission file from the file server 1201. According to the request, the third facsimile machine 1100 acquires the file specifying information 1014 from the file server 1201 (S1010). The file specifying information 1014 can be a file body or information which clarifies a location of the file such as a path, a URI and a URL. The third facsimile machine 1100 selects an appropriate data conversion device 1200 from the data conversion devices 1200 on the network. Then, the third facsimile machine 1100 transmits the file specifying information 1014 to the agent software of the selected data conversion device 1200 (S1012).

For example, when the file specifying information 1014 is in a data format which can be processed by an application program A, the third facsimile machine 1100 transmits the file specifying information 1014 to the data conversion device 1200a. In the same manner, when the file specifying information 1014 is in a data format which can be processed by an application program B, the third facsimile machine 1100 transmits the file specifying information 1014 to the data conversion device 1200b. The third facsimile machine 1100 can transmit the file body as the file specifying information 1014. In this case, the third facsimile machine 1100 acquires the file body once from the file server 1201 and transmits the file body as the file specifying information 1014 to the data conversion device 1200. The agent software 1050 runs the application program 1052 corresponding to the file specifying information 1014 (S1014). The agent software 1050 converts the transmission file into an image content by the image conversion software 1054. Then, the agent software 1050 acquires the image content from the image conversion software 1054 (S1016). The agent software 1050 transmits the image content to the third facsimile machine 1100 (S1018). Then, the third facsimile machine 1100 converts the image content into communication data for a facsimile transmission and transmits the communication data to the fourth facsimile machine 1020 (S1020).

Figure 9:
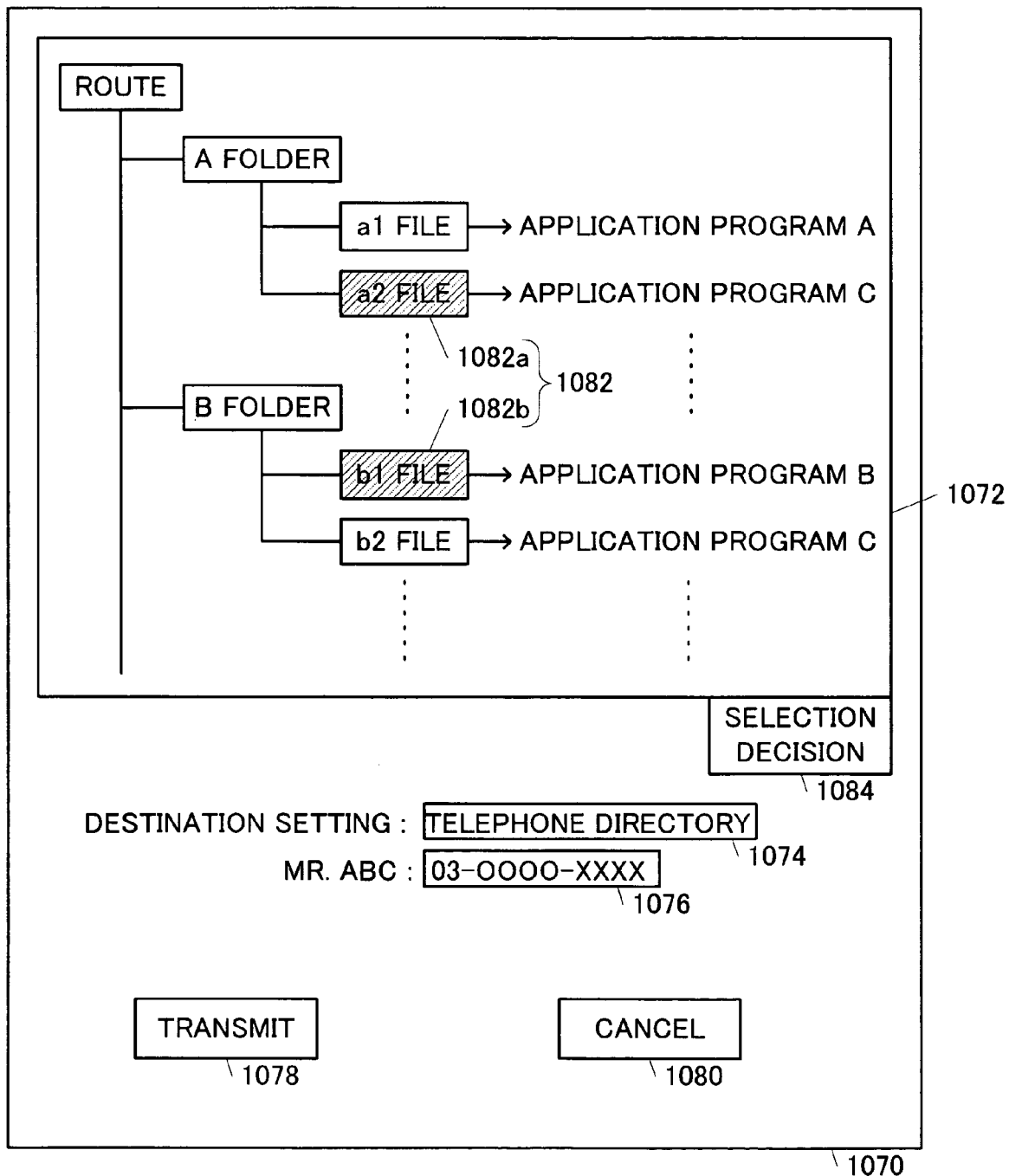
FIG. 9 shows an example of an operation screen of the third facsimile machine.

FIG. 9 shows an example of an operation screen of the third facsimile machine 1100. A facsimile operation screen 1070 of the third facsimile machine 1100 of FIG. 9 includes a GUI of a touch panel format for accepting an operation from the user. The facsimile operation screen 1070 includes a file list display area 1072, a telephone directory display button 1074, a destination input area 1076, a transmit button 1078, a cancel button 1080 and a selection decision button 1084 or the like.

When one transmission file is designated on the file list display area 1072, for example, the third facsimile machine 1100 changes a displayed of a designated file 1082a into a hatching display. Then, when the selection decision button 1084 is pressed, the file displayed with hatchings is selected as the transmission file.

When setting the destination, the user inputs a facsimile number, an electronic mail address or the like to the destination input area 1076. When the telephone directory display button 1074 is pressed, a telephone directory is displayed. Therefore, the user can select a destination from the displayed telephone directory.

When a destination is input to the destination input area 1076, the transmit button 1078 becomes capable of being pressed. When the transmit button 1078 is pressed, the third facsimile machine 1100 carries out a facsimile transmission of the transmission file to the destination input to the destination input area 1076. When the cancel button 1080 is pressed, the facsimile transmission process is interrupted.

When a plurality of transmission files are designated, the third facsimile machine 1100 changes a display of the designated files 1082a and 1082b into a hatching display. When a destination is input to the destination input area 1076 by the user, the transmit button 1078 becomes capable of being pressed. When the transmit button 1078 is pressed, the third facsimile machine 1100 provides the plurality of transmission files to one or a plurality of the data conversion devices 1200. The data conversion device 1200 converts the data format into the image content, and the third facsimile machine 1100 acquires the converted file. The third facsimile machine 1100 can carry out a facsimile transmission of the acquired files sequentially or can carry out a facsimile transmission of the acquired files all at once.

Figure 10:
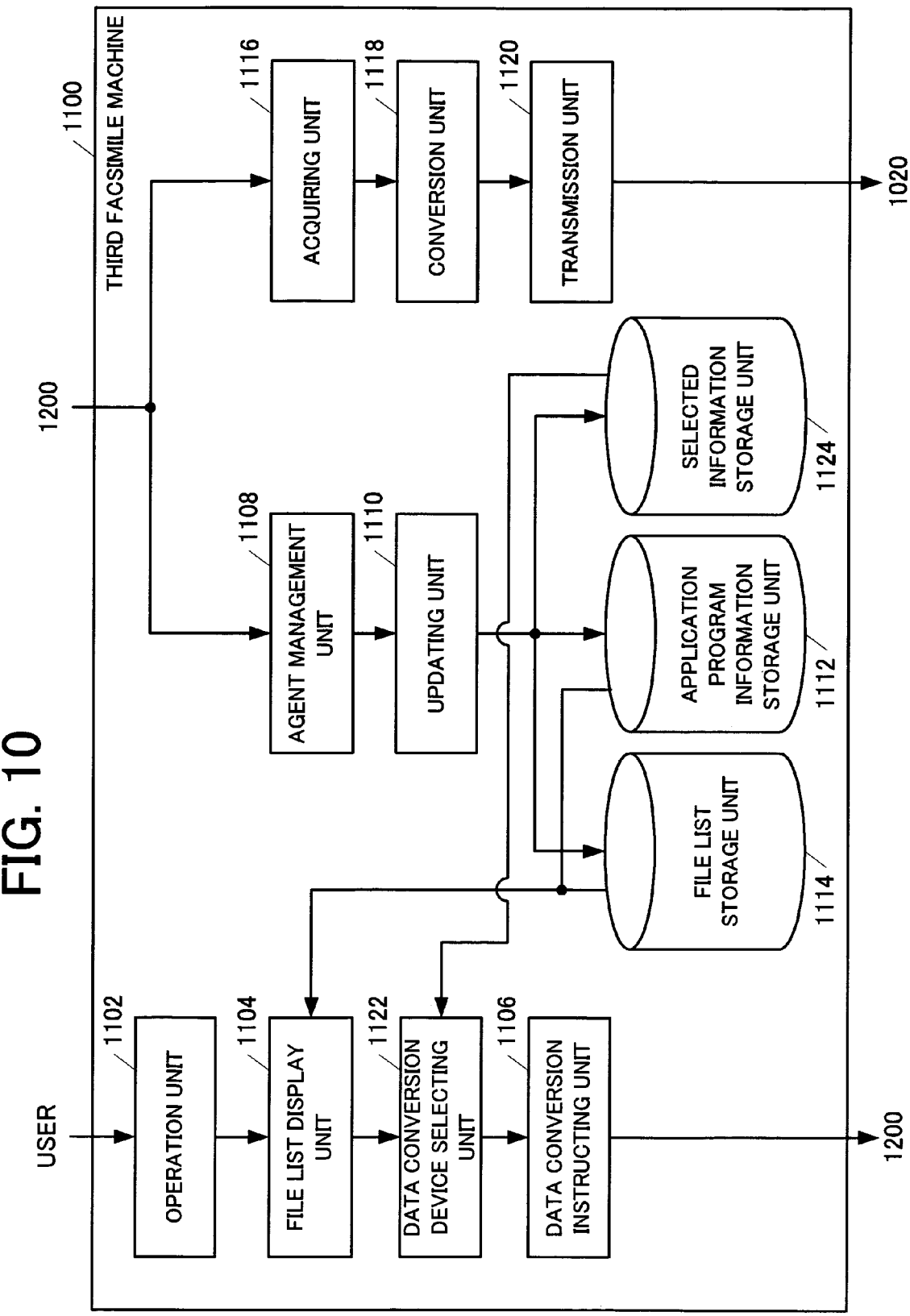
FIG. 10 is a block diagram showing an inner configuration of the third facsimile machine.

FIG. 10 is a block diagram showing an inner configuration of the third facsimile machine 1100. In terms of hardware components, each of the constituent elements of the third facsimile machine 1100 is realized primarily by a CPU of any computer, a memory, a program which implements a function for managing the agent software 1050 of the data conversion device 1200 loaded in the memory, a storage unit such as a hard disk for storing the program, an interface for a network connection and a modem for a facsimile communication or the like. However, it is to be understood by those skilled in the art that there are variations to the methods and the devices for implementing each of the constituent elements of the third facsimile machine 1100. Each of the drawings to be described hereinafter shows blocks representing units of function, instead of units of hardware.

A file list display unit 1104 loads data stored in an application program information storage unit 1112 and a file list storage unit 1114. Then, the file list display unit 1104 displays a file list of files which can be transmitted by facsimile in the file list display area 1072. The file list display unit 1104 also displays application program names corresponding to the files. The application program information storage unit 1112 stores a relationship between information for specifying the data conversion device 1200 and the application program 1052 which can be run on the data conversion device 1200. The file list storage unit 1114 stores a relationship between a file name and the file information specifying information 1014. As another embodiment, the application program information storage unit 1112 and the file list storage unit 1114 can be combined. That is, one information storage unit can store the name of the data conversion device, the application program 1052 which can be run, the file name and the file specifying information 1014.

An operation unit 1102 is an input device such as a keyboard, a button, a touch panel and a mouse. The operation unit 1102 accepts various requests and instructions for the facsimile operation screen 1070 of FIG. 9 from the user. The operation unit 1102 provides the transmission file accepted from the user to the file list display unit 1104.

Figure 17:
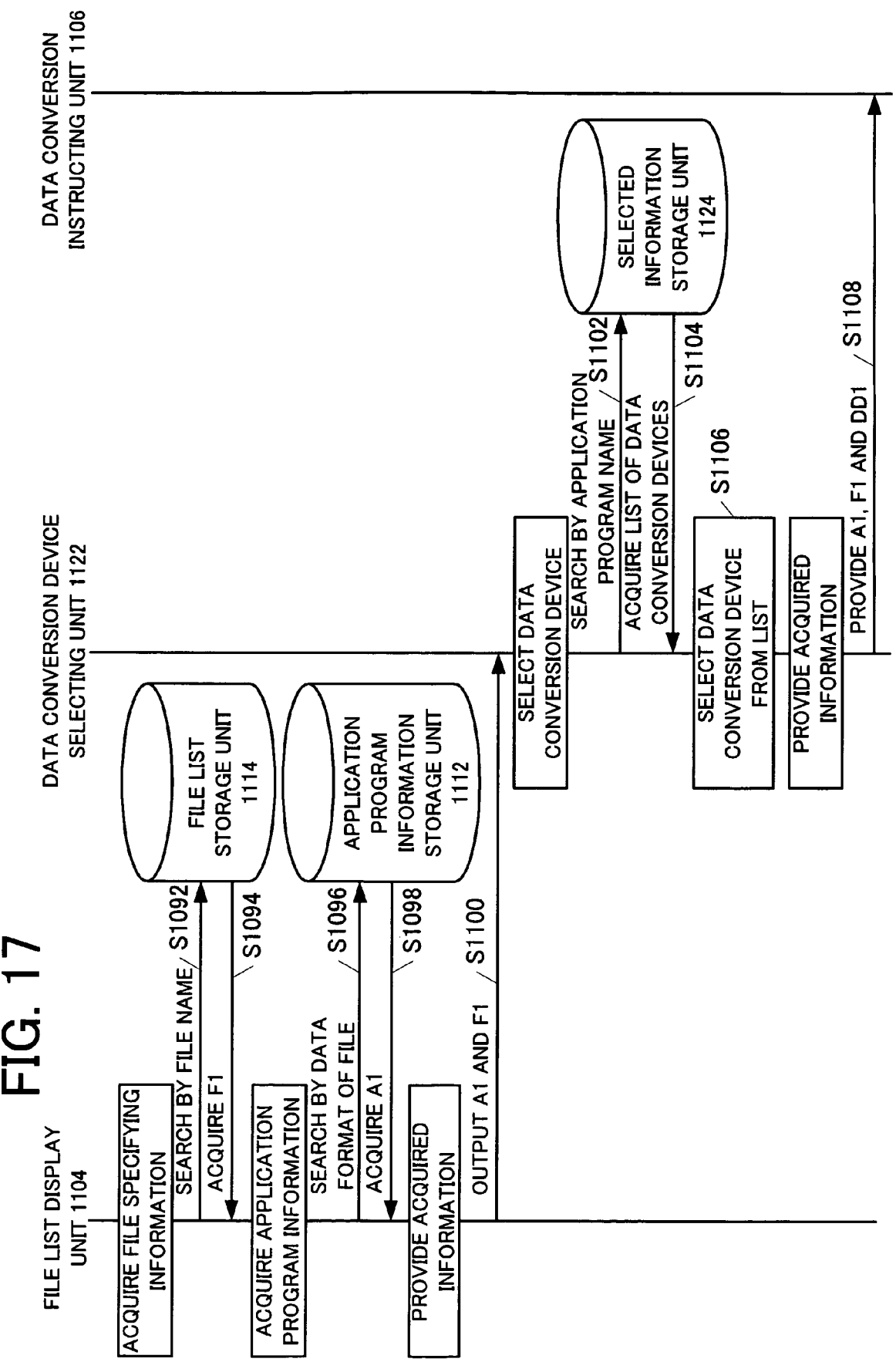
FIG. 17 shows an example of a sequence of a series of processes carried out between a file list display unit, a data conversion device selecting unit and a data conversion instructing unit.

FIG. 17 shows an example of a sequence of a series of processes between the file list display unit 1104, a data conversion device selecting unit 1122 and a data conversion instructing unit 1106.

With the file name or the like of the transmission file provided from the operation unit 1102 as the key (S1092), the file list display unit 1104 acquires file specifying information F1 from the file list storage unit 1114 (S1094). Then, in accordance with a data format of the transmission file (S1096), the file list display unit 1104 acquires application program information A1 including an application program name or the like which can run the file in that data format (S1098). The file list display unit 1104 outputs the file specifying information F1 and the application program information A1 to the data conversion device selecting unit 1122 (S1100).

The data conversion device selecting unit 1122 acquires the file specifying information F1 and the application program information A1 from the file list display unit 1104. With the application program name or the like included in the application program information A1 as the key (S1102), the data conversion device selecting unit 1122 acquires from a selected information storage unit 1124, a list of the data conversion devices 1200 which can run the application program 1052 and a state of the load in the data conversion devices 1200 (S1104). For example, the data conversion device selecting unit 1122 can select from the list, a data conversion device 1200 with a small load, i.e., having a small number of jobs, a low CPU utilization or a small memory usage (S1106). Accordingly, the data conversion device 1200 with a small load or the like can be selected appropriately, and the data conversion process into the image content can be executed by the selected data conversion device 1200 within a short period of time.

The selected information storage unit 1124 stores a list of the number of jobs, the CPU utilization or the memory usage (hereinafter referred to as "task information") of the data conversion device 1200. The data conversion device selecting unit 1122 provides the application program information A1, the file specifying information F1 and a selected data conversion device name DD1 to the data conversion instructing unit 1106 (S1108).

Referring to FIG. 10 again, the data conversion instructing unit 1106 acquires the file specifying information F1 and the application program information A1 or the like of the transmission file from the data conversion device selecting unit 1122. Then, the data conversion instructing unit 1106 transmits the acquired information to the data conversion device 1200 selected by the data conversion device selecting unit 1122 and requests a conversion of the data format of the image content.

Figure 14:
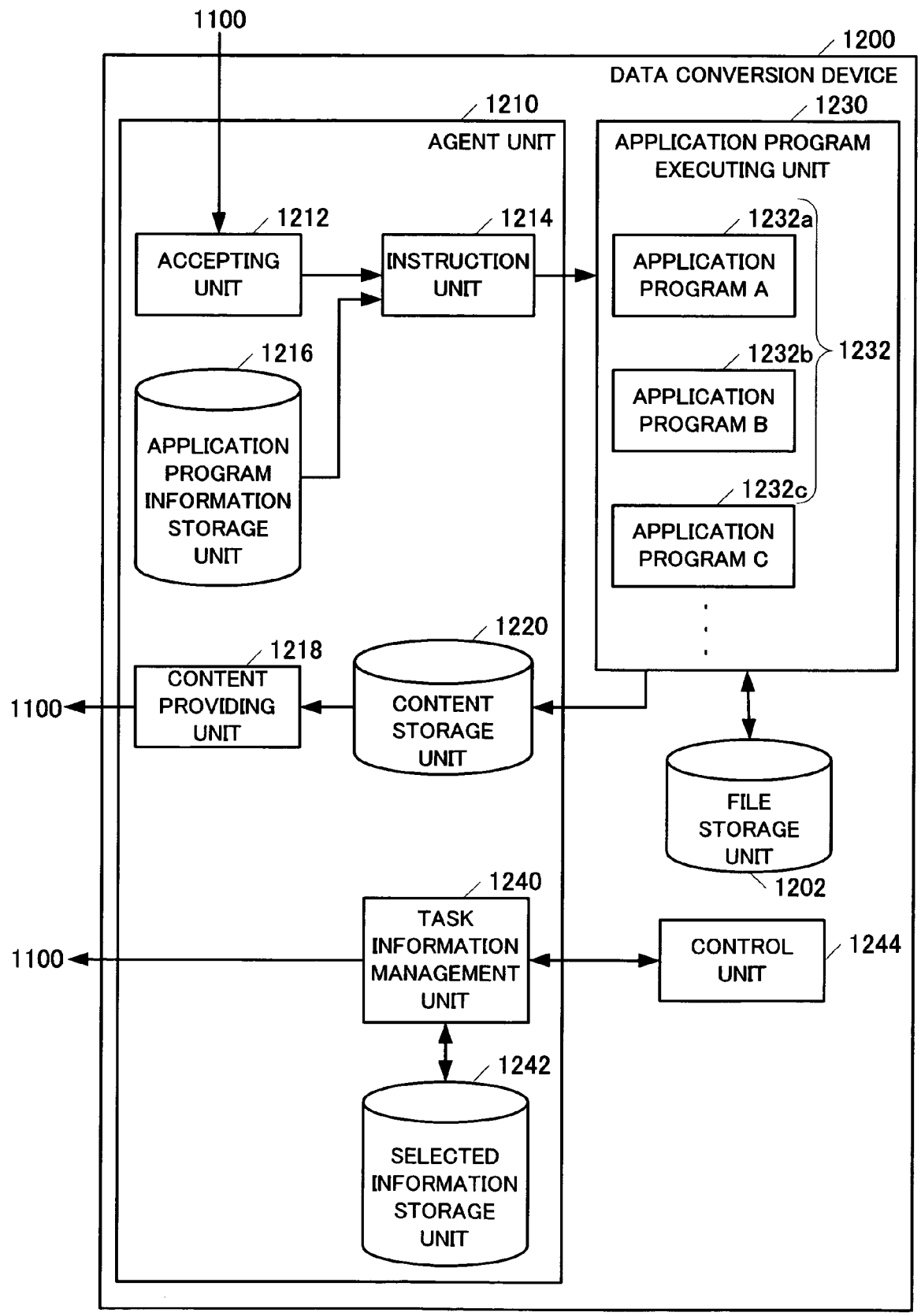
FIG. 14 is a block diagram showing an inner configuration of a data conversion device.

An agent management unit 1108 of the third facsimile machine 1100 exchanges data or command, etc. with an agent unit 1210 of the data conversion device 1200 of FIG. 14 and the file server 1201 of FIG. 8 via the network. By using various data acquired by the data conversion device 1200 or the file server 1201, the agent management unit 1108 synchronizes the data of the third facsimile machine 1100.

Figure 16:
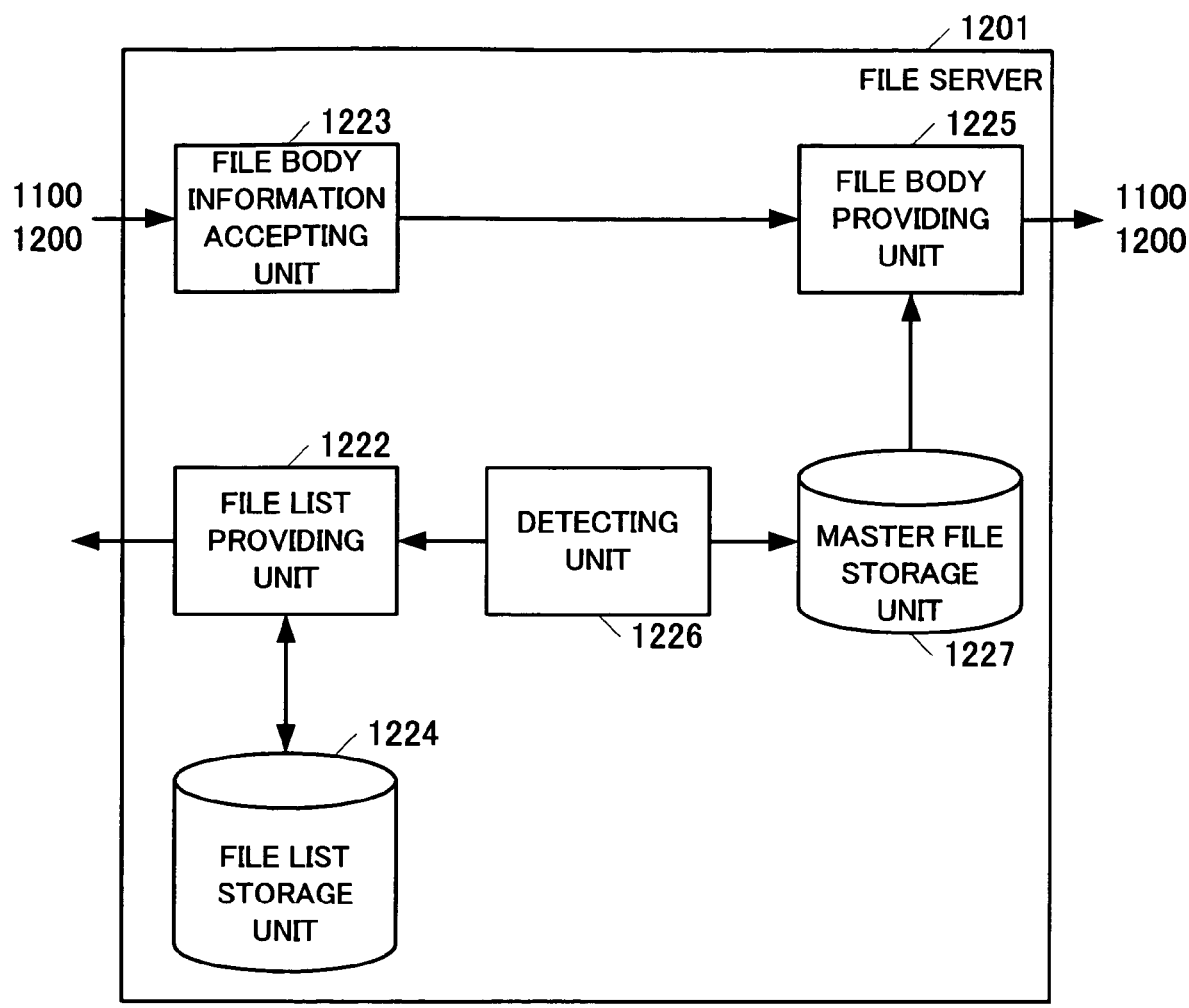
FIG. 16 is a block diagram showing an inner configuration of a file server.

Specifically, the agent management unit 1108 acquires the data of the application program information storage unit 1216 of FIG. 14, the file list storage unit 1224 of FIG. 16 and the selected information storage unit 1242 of FIG. 14. By using the acquired data, the agent management unit 1108 instructs to update the data of the application program information storage unit 1112 of FIG. 10, the file list storage unit 1114 or the selected information storage unit 1124. The updating process is instructed when the agent management unit 1108 instructs the data conversion device 1200 to update the data or when the agent management unit 1108 receives an instruction of the updating process from the data conversion device 1200.

In accordance with such an instruction from the agent management unit 1108, the updating unit 1110 updates the data stored in the application program information storage unit 1112, the file list storage unit 1114 or the selected information storage unit 1124 according to necessity. That is, when the data of the application program information storage unit 1112 is different from the data of the application program information storage unit 1216, the updating unit 1110 reflects the latter on the former. When the file specifying information 1014 of the file list storage unit 1114 is different from the data of the file list storage unit 1224, the updating unit 1110 reflects the latter on the former. Furthermore, when the data of the selected information storage unit 1124 is different from the data of the selected information storage unit 1242, the updating unit 1110 reflects the latter on the former. Accordingly, the file specifying information 1014, the application program information and the task information of the third facsimile machine 1100 can be synchronized with those of the data conversion device 1200 or the file server 1201. Accordingly, for example, even when the task information of the data conversion device 1200 is changed, the third facsimile machine 1100 can acquire the changed task information from the data conversion device 1200 and select the data conversion device 1200 with a small load from the plurality of the data conversion devices 1200.

Figure 11:
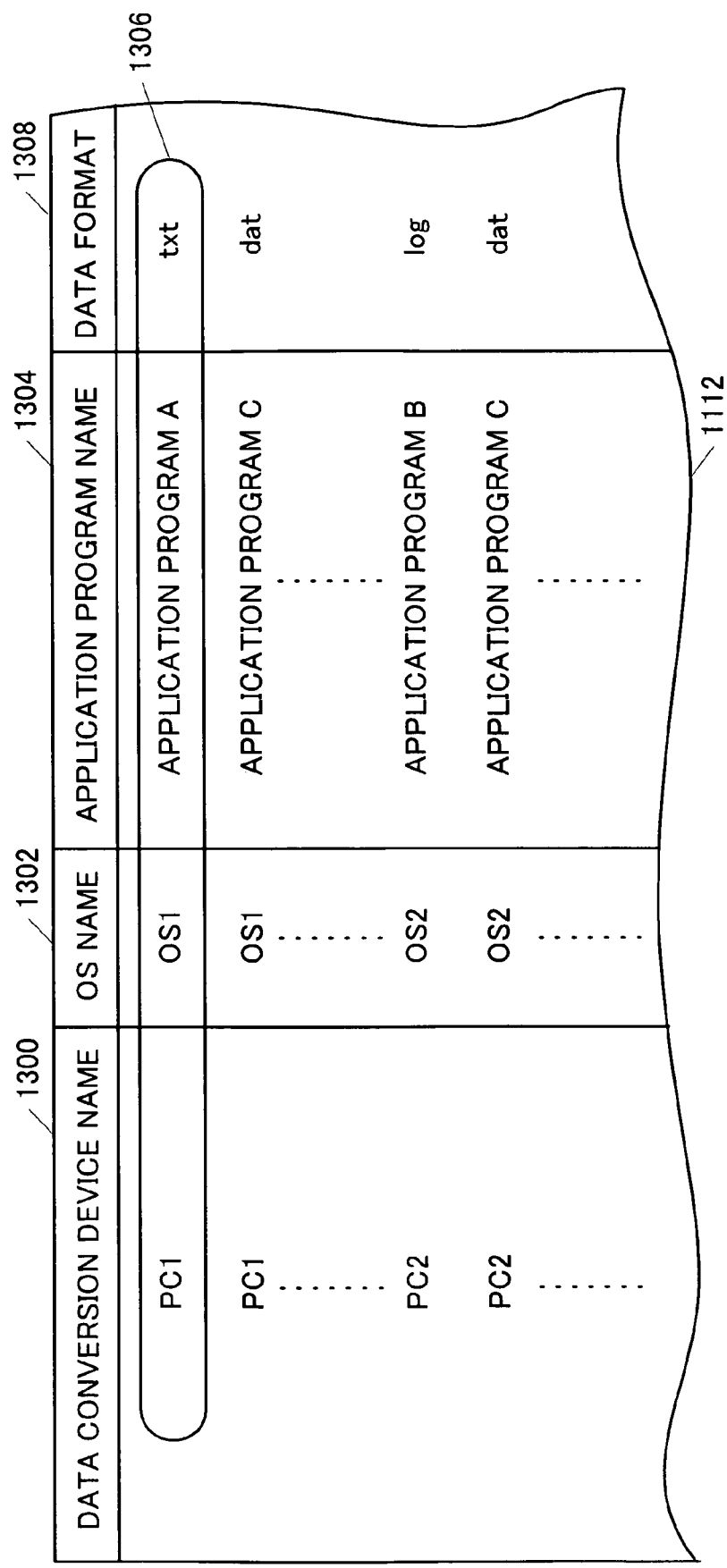
FIG. 11 shows an example of a data structure stored in an application program information storage unit.

FIG. 11 shows an example of a data structure stored in the application program information storage unit 1112 of FIG. 10. A data conversion device name section 1300 stores information for specifying the data conversion device 1200 on the network, such as an identification name, an ID, an IP address and a MAC address of the data conversion device 1200. An OS name section 1302 stores an OS name. An application program name section 1304 stores an application program name for running a file. A data format section 1308 stores a data format name of the file. In FIG. 11, with respect to data 1306, it can be understood that a data conversion device name "PC1" has an OS name "OS1" and an application program name "application program A" which can run a file of the data format section 1308 "txt". The data structure of the application program information storage unit 1216 of the data conversion device 1200 can be the same as the data structure of the application program information storage unit 1112. A name of the data conversion device 1200 is stored in the data conversion device name section 1300.

FIG. 12 shows an example of the data structure stored in the file list storage unit 1114 of FIG. 10. A file ID section 1400 stores a file ID of the file. A file name section 1402 stores a file name. A path name section 1404 stores a path name. As another example, the path name section 1404 can store the file specifying information 1014. In FIG. 12, with respect to data 1406, a file ID of a file with a file name "a1 file" is 1 and the file is located in a path "¥¥FILE SERVER¥A FOLDER". The data structure of the file list storage unit 1224 can be the same as the data structure of the file list storage unit 1114.

Figure 13:
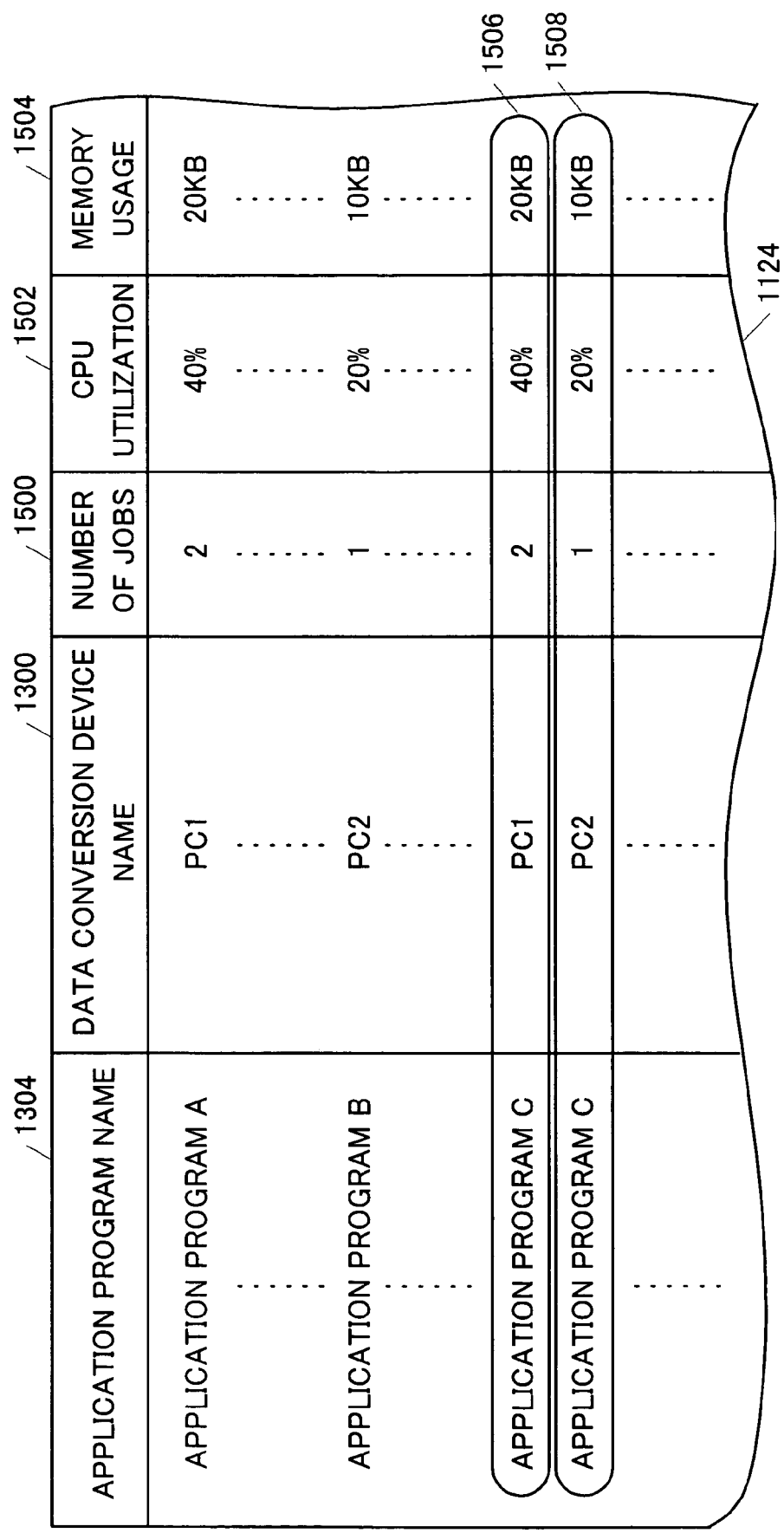
FIG. 13 shows an example of a data structure stored in a selected information storage unit.

FIG. 13 shows an example of a data structure stored in the selected information storage unit 1124 of FIG. 10. In the same manner as FIG. 11, an application program name section 1304 stores an application program name for running a file. A data conversion device name section 1300 stores information for specifying the data conversion device 1200 on the network. A number of jobs section 1500 stores a number of jobs in the data conversion device 1200. A CPU utilization section 1502 stores a CPU utilization in the data conversion device 1200. A memory usage section 1504 stores a memory usage in the data conversion device 1200. The number of jobs section 1500, the CPU utilization section 1502 and the memory usage section 1504 can be other indicators indicating the load of the data conversion device 1200.

In FIG. 13, with respect to data 1506, an application program name "application program C" is installed in a data conversion device name "PC1". The processing state of the data conversion device name "PC1" is the number of jobs "2", the CPU utilization "40%" and the memory usage "20 KB (kilobyte)". Data 1508 can be interpreted in the same manner as the data 1506. When comparing the data 1506 and the data 1508, the number of jobs, the CPU utilization and the memory usage of the data 1508 are lower than those of the data 1506. Therefore, the third facsimile machine 1100 can select the data conversion device name "PC2" with a smaller load. The data conversion process can be carried out within a short period of time with the data conversion device name "PC2". The data structure of the selected information storage unit 1242 of the data conversion device 1200 can be the same as the data structure of the selected information storage unit 1124. The name of the data conversion device 1200 is stored in the data conversion device name section 1300.

Referring to FIG. 10 again, the data conversion instructing unit 1106 of the third facsimile machine 1100 transmits an image content generating request to the data conversion device 1200 designated by the data conversion device selecting unit 1122. After receiving the request, the data conversion device 1200 generates the image content and provides the image content to the third facsimile machine 1100. The third facsimile machine 1100 acquires the image content provided from the data conversion device 200 by the acquiring unit 1116 and provides the image content to a conversion unit 1118.

For example, the conversion unit 1118 converts the image content provided from the acquiring unit 1116 into a data format for a facsimile transmission such as G3 and G4. A transmission unit 1120 acquires the content converted into facsimile transmission data by the conversion unit 1118.

Then, the transmission unit 1120 transmits the content to the fourth facsimile machine 1020 of FIG. 8. Accordingly, even when a prescribed application program is not installed in the third facsimile machine 1110, the image content can be generated by the data conversion device 1200, and the third facsimile machine 1100 can acquire the generated image content.

FIG. 14 is a block diagram showing an inner configuration of the data conversion device 1200. An accepting unit 1212 acquires the file specifying information 1014 to be transmitted or the application program information or the like from the data conversion instructing unit 1106.

With the application program information or the like provided from the accepting unit 1212 as the key, an instructing unit 1214 selects an application program 1232 to be run. The instructing unit 1214 can select the application program 1232 to be run from the data of the application program information storage unit 1216. The instructing unit 1214 provides the selected application program information or the file specifying information 1014 to an application program executing unit 1230. The instructing unit 1214 instructs the application program executing unit 1230 to run the application program 1232.

The application program executing unit 1230 includes a function for loading the file stored in the file storage unit 1202, running the application program 1232 corresponding to the file and converting the file into the image content. In accordance with the file specifying information 1014 or the application program information provided from the instructing unit 1214, the application program executing unit 1230 converts the designated file into an image content and stores the image content in a content storage unit 1220. The file storage unit 1202 stores files which can be transmitted by facsimile.

A content providing unit 1218 acquires the image content stored in the content storage unit 1220 and provides the acquired image content to the acquiring unit 1116 of the third facsimile machine 1100.

A control unit 1244 is a CPU provided in the PC or the like. The control unit 1244 provides the task information to a task information management unit 1240.

The task information management unit 1240 includes a function for requesting task information to the control unit 1244 and updating the data stored in the selected information storage unit 1242 in accordance with the acquired task information. In accordance with the request of the agent management unit 1108, the data stored in the selected information storage unit 1242 is transmitted to the agent management unit 1108 of the third facsimile machine 1100.

FIG. 16 is a block diagram showing an inner configuration of the file server 1201. A file body information accepting unit 1223 accepts from the third facsimile machine 1100 or the data conversion device 1200, a request to acquire file body information. The file body information accepting unit 1223 requests to acquire the file body from a file body providing unit 1225. By receiving the request, the file body providing unit 1225 acquires the file body from a master file storage unit 1227 and provides the file body to the third facsimile machine 1100 or the data conversion device 1200.

A detecting unit 1226 monitors a file which can be transmitted by facsimile stored in the master file storage unit 1227 and a file list of the file list storage unit 1224. When there is a difference between the file and the file list, the detecting unit 1226 updates the file list stored in the file list storage unit 1224. For example, when a file which can be transmitted by facsimile is added to or deleted from the master file storage unit 1227, or when the file name is changed, the detecting unit 1226 updates the file list stored in the file list storage unit 1224. The file list is updated when the agent management unit 1108 requests the file list to be provided or when the detecting unit 1226 updates the file list storage unit 1224 for each prescribed time. After updating the file list, a file list providing unit 1222 provides the file list stored in the file list storage unit 1224 to the third facsimile machine 1100.

Figure 15:
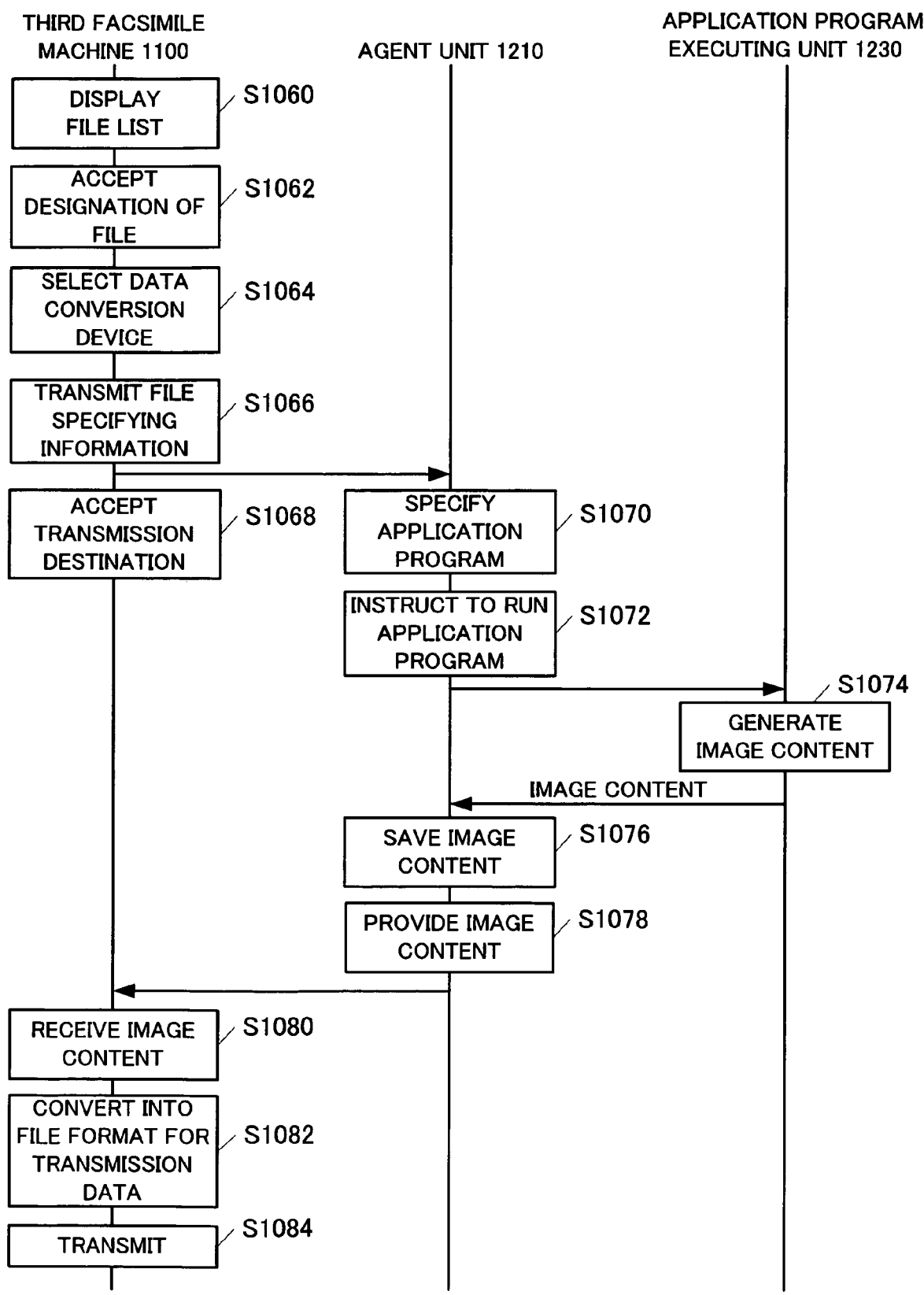
FIG. 15 is a sequence diagram relating to a conversion process into an image content carried out between the third facsimile machine and the data conversion device.

FIG. 15 is a sequence diagram relating to a conversion process into the image content carried out between the third facsimile machine 1100 and the data conversion device 1200.

The third facsimile machine 1100 displays a list of files which can be transmitted by facsimile on the network (S1060). The third facsimile machine 1100 accepts a transmission file from the user (S1062). Then, the third facsimile machine 1100 selects a data conversion device 1200 where the image content is to be generated (S1064). The flow between S1062 and S1064 corresponds to FIG. 17. The third facsimile machine 1100 transmits the file specifying information 1014 such as the file name to the agent unit 1210 in the selected data conversion device 1200 (S1066). The third facsimile machine 1100 also accepts a destination designated by the user (S1068). The agent unit 1210 specifies the application program 1232 to be run in accordance with the file specifying information 1014 (S1070). The agent unit 1210 instructs the application program executing unit 1230 to run the application program 1232 (S1072). The application program executing unit 1230 runs the application program 1232 and generates the image content (S1074). The agent unit 1210 acquires the image content from the application program executing unit 1230 and saves the image content (S1076). Then, the agent unit 1210 transmits the image content to the third facsimile machine 1100 (S1078). The third facsimile machine 1100 receives the image content (S1080) and converts the image content into a data format for a facsimile transmission (S1082). Then, the third facsimile machine 1100 transmits the image content by facsimile (S1084).

Accordingly, a series of operations from the selection of a prescribed file from the third facsimile machine 1100 to the transmission of the file to the fourth facsimile machine 1020 can be carried out just by the operation from the third facsimile machine 1100 via the network. As a result, a period of time required for the facsimile transmission can be shortened, a time required for a printing process can be reduced and the cost of printing papers can be reduced.

The second embodiment of the present invention has been described. The above-described embodiment is an example. It is to be understood by those skilled in the art that there are variations to the combinations of each of the constituent elements and each of the processes and those variations also fall within the scope of the present invention. In the following, some of the variations of the second embodiment of the present invention will be described.

In the second embodiment of the present invention, the agent unit 1210 of the data conversion device 1200 is managed by the agent management unit 1108 of the third facsimile machine 1100. Therefore, the data conversion device 1200 includes a function as a client of the third facsimile machine 1100 and is loaded in a terminal device such as a PC. As another embodiment of the present invention, a device having the function of the agent unit 1210 can be provided separately from the data conversion device 1200. The device having the function of the agent unit 1210 can exchange data or command with the application program 1052 and the image conversion software 1054 on the terminal device such as the PC via the network 1012.

As another embodiment of the present invention, when the user designates the transmission file to the file list display area 1072 and the selection decision button 1084 is pressed, the third facsimile machine 1100 transmits the file specifying information 1014 of the file to the agent software 1050. Accordingly, without waiting for a destination of the facsimile transmission being designated by the user, the third facsimile machine 1100 can prepare the image content of the transmission file. As a result, the facsimile transmission process can be carried out efficiently. In addition, the image data loaded by a general scanner function of the third facsimile machine 1100 and the image content generated via the data conversion device 1200 can be transmitted sequentially by one facsimile transmission process carried out by the user. Accordingly, the facsimile transmission process can be carried out efficiently.

In the second embodiment of the present invention, the file which can be transmitted by facsimile is stored in the file server 1201. The file is forwarded to the data conversion device 1200 which supports the data format of the file, and the data conversion process into the image content is carried out in the data conversion device 1200. As another embodiment of the present invention, when a file which can be transmitted by facsimile is stored in each of the data conversion devices 1200 and not in the file server 1201, a transmission file is forwarded to the data conversion device 1200 which supports the data format of the file. Then, the data conversion process into the image content is carried out by the data conversion device 1200. Accordingly, when a normal process cannot be executed due to a failure in a certain data conversion device 1200, by transferring the process to another data conversion device 1200, a tolerance against the failure in the facsimile communication system can be improved.

What is claimed is:

1. A facsimile machine comprising:
a touch panel type user interface to enter operations from a user, the operations including selecting file specifying information specifying a file to be transmitted from the facsimile machine and entering a transmitting instruction to transmit the specified file from the facsimile machine;
means for transmitting the file specifying information specifying the file to be transmitted from the facsimile machine in response to entry of the transmitting instruction to transmit the specified file, wherein the means for transmitting transmits the file specifying information to a data conversion device which processes the file specified by the file specifying information and generates an image content in accordance with a file of a prescribed data format;
means for acquiring from the data conversion device, the image content generated in accordance with the file specified by the file specifying information;
means for converting the image content into communication data for a facsimile transmission; and
means for transmitting the communication data to a prescribed destination.

2. The facsimile machine according to claim 1, wherein the file specifying information is a Uniform Resource Locator (URL).

3. The facsimile machine according to claim 1, further comprising means for displaying a list of files to be processed.

4. The facsimile machine according to claim 1, further comprising means for displaying a file name of the file to be processed and an application program name corresponding to the file.

5. A data conversion device comprising:
means for receiving from a prescribed facsimile machine, file specifying information specifying a prescribed file;
means for generating an image content of the prescribed file, wherein the means for generating selects from a plurality of application programs an application program corresponding to the prescribed file in accordance with the file specifying information received from the prescribed facsimile machine and uses the application program corresponding to the prescribed file to generate image content of the prescribed file; and
means for transmitting the image content to the facsimile machine.

6. The data conversion device according to claim 5, wherein the file specifying information is a Uniform Resource Locator (URL).

7. The data conversion device according to claim 5, further comprising means for holding a relationship between a data format of the file and the application program for converting the file into the image content;
wherein the means for generating selects the application program corresponding to the file in accordance with the relationship.

8. A facsimile system, comprising:
a plurality of data conversion devices, the respective data conversion devices converting respective transmission files, each having a prescribed data format, into image content; and
a facsimile machine, the facsimile machine comprising
means for accepting a designation of a transmission file;
means for selecting from the plurality of data conversion devices, a data conversion device to convert the designated transmission file to image content, wherein the means for selecting determines a data conversion device, of the plurality of data conversion devices, that supports the data format of the designated transmission file and selects the data conversion device determined to support the data format of the designated transmission file;
means for transmitting to the selected data conversion device, file specifying information specifying the designated transmission file;
means for acquiring from the data conversion device to which the file specifying information is transmitted, the image content generated in accordance with the transmission file specified by the file specifying information;
means for converting the acquired image content into communication data for a facsimile transmission; and
means for transmitting the communication data to a prescribed destination.

9. The facsimile machine according to claim 8, wherein the file specifying information is a Uniform Resource Locator (URL).

10. The facsimile machine according to claim 8, further comprising means for holding a data format of the file capable of being converted into the image content by each of the data conversion devices;
wherein in accordance with the data format of the transmission file, the means for selecting selects the data conversion device.

11. The facsimile machine according to claim 8, further comprising means for managing a load of each of the data conversion devices;
  wherein the means for selecting selects the data conversion device in accordance with the load.

12. A network system including a facsimile machine and a data conversion device,
  wherein the facsimile machine comprises:
    means for transmitting to the data conversion device, which generates an image content in accordance with a file of a prescribed data format, file specifying information specifying a file to be processed by the data conversion device;
    means for acquiring from the data conversion device, the image content generated in accordance with the file specified by the file specifying information;
    means for converting the image content into communication data for a facsimile transmission; and
    means for transmitting the communication data to a prescribed destination;
  wherein the data conversion device comprises:
    means for receiving from the facsimile machine, the file specifying information specifying a prescribed file;
    means for generating an image content of the prescribed file,
  wherein the means for generating selects from a plurality of application programs an application program corresponding to the prescribed file in accordance with the file specifying information received from the facsimile machine and uses the application program corresponding to the prescribed file to generate image content of the prescribed file; and
    means for transmitting the image content to the facsimile machine.

13. The network system according to claim 12, wherein the file specifying information is a Uniform Resource Locator (URL).

14. The network system according to claim 12, wherein the file specifying information is a file path.

15. An image content acquiring method in a facsimile machine, comprising the steps of:
  selecting, via a touch panel type user interface of the facsimile machine, file specifying information specifying a file to be transmitted from the facsimile machine;
  entering, via the touch panel type user interface of the facsimile machine, a transmitting instruction to transmit the specified file from the facsimile machine;
  transmitting, in response to entry of the transmitting instruction, the file specifying information specifying the file to be transmitted from the facsimile machine, wherein the means for transmitting transmits the file specifying information to a data conversion device, which generates an image content in accordance with a file of a prescribed data format,
  acquiring from the data conversion device, the image content generated in accordance with the file specified by the file specifying information;
  converting the image content into communication data for a facsimile transmission; and
  transmitting the communication data to a prescribed destination.

16. The image content acquiring method according to claim 15, wherein the file specifying information is a Uniform Resource Locator (URL).

17. An image content acquiring method in a facsimile machine comprising the steps of:
  accepting a designation of a transmission file;
  selecting from a plurality of data conversion devices, a data conversion device to convert the designated transmission file to image content, wherein the selecting includes determining a data conversion device, of the plurality of data conversion devices, that supports a data format of the designated transmission file and selecting the data conversion device determined to support the data format of the designated transmission file;
  transmitting file specifying information specifying the designated transmission file to the selected data conversion device;
  acquiring from the data conversion device to which the file specifying information is transmitted, the image content generated in accordance with the transmission file specified by the file specifying information;
  converting the acquired image content into communication data for a facsimile transmission; and
  transmitting the communication data to a prescribed destination.

18. The image content acquiring method according to claim 17, wherein the file specifying information is a Uniform Resource Locator (URL).

* * * * *